United States Patent
Taniguchi et al.

[11] Patent Number: 6,121,614
[45] Date of Patent: Sep. 19, 2000

[54] PYROELECTRIC-TYPE IR RECEIVING ELEMENT AND IR SENSOR USING THE SAME

[75] Inventors: Ryo Taniguchi, Shijonawate; Motoo Ikari; Tomoaki Matsushima, both of Kyoto; Hiroyuki Yagyu, Hirakata; Yoshihiro Matsumura, Kadoma; Kyosuke Iribe, Shijonawate; Toshiyuki Suzuki, Nara; Sadayuki Sumi, Hirakata; Kazuhiro Horiuchi, Kasugai; Hideki Ohashi, Owariasahi, all of Japan

[73] Assignees: Matsushita Electricworks, Ltd., Osaka; Yamaju Ceramics Co., Ltd., Owariasahi, both of Japan

[21] Appl. No.: 08/837,105

[22] Filed: Apr. 14, 1997

[30] Foreign Application Priority Data

Apr. 15, 1996 [JP] Japan ................................. 8-118406
Apr. 23, 1996 [JP] Japan ................................. 8-100769

[51] Int. Cl.[7] .............................. G01J 5/02; H01L 37/02
[52] U.S. Cl. ................ 250/338.3; 250/332; 250/338.4; 250/338.1; 250/338.2; 250/349; 313/388; 348/165; 315/359
[58] Field of Search ................................. 250/332, 338.3, 250/338.4, 338.1, 338.2, 349; 313/388; 348/165; 315/359

[56] References Cited

U.S. PATENT DOCUMENTS 4,942,301 7/1990 Voles ................................. 250/338.3
5,270,555 12/1993 Ito et al. .
5,420,420 5/1995 Taylor et al. ........................ 250/338.3
5,523,564 6/1996 Yamada et al. ...................... 250/338.1

FOREIGN PATENT DOCUMENTS 61-2025 1/1986 Japan .
63-138221 6/1988 Japan ................................. 250/338.3
7-174623 7/1995 Japan .
2 278 496 11/1994 United Kingdom .

*Primary Examiner*—Constantine Hannaher
*Assistant Examiner*—Andrew Israel
*Attorney, Agent, or Firm*—Armstrong, Westerman, Hattori, McLeland & Naughton

[57] ABSTRACT

A pyroelectric-type IR receiving element comprises a pyroelectric substrate which is fixed to a supporting body at its support ends and at least one rectangular patch formed in the substrate. The patch is formed on its opposite surfaces with first and second electrodes which are overlapped to each other. The substrate has a U-shaped slit composed of a pair of side slits and a base slit connecting the side slits. The U-shaped slit surrounds continuously three sides of the patch, so that the patch is supported by the substrate in a cantilever fashion at a cantilever end which is opposed to one of the support ends of the substrate. Since a thermal stress applied to the substrate when the substrate is exposed to a temperature change is absorbed by the U-shaped slit, a stress concentration to be considered is not developed in the patch. As a result, it is possible to reduce the occurrence of popcorn noise, while maintaining good IR sensitivity.

11 Claims, 23 Drawing Sheets

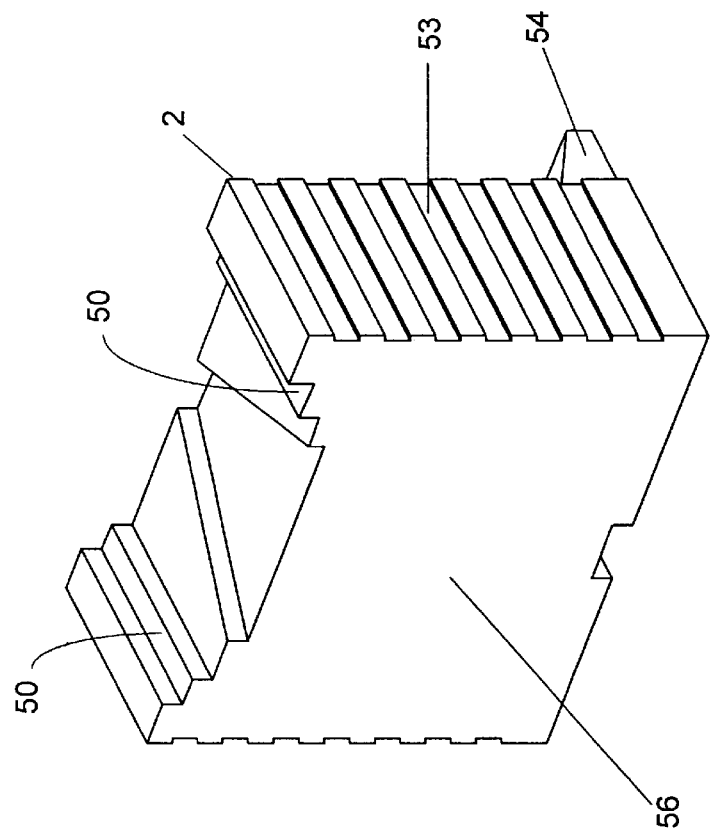
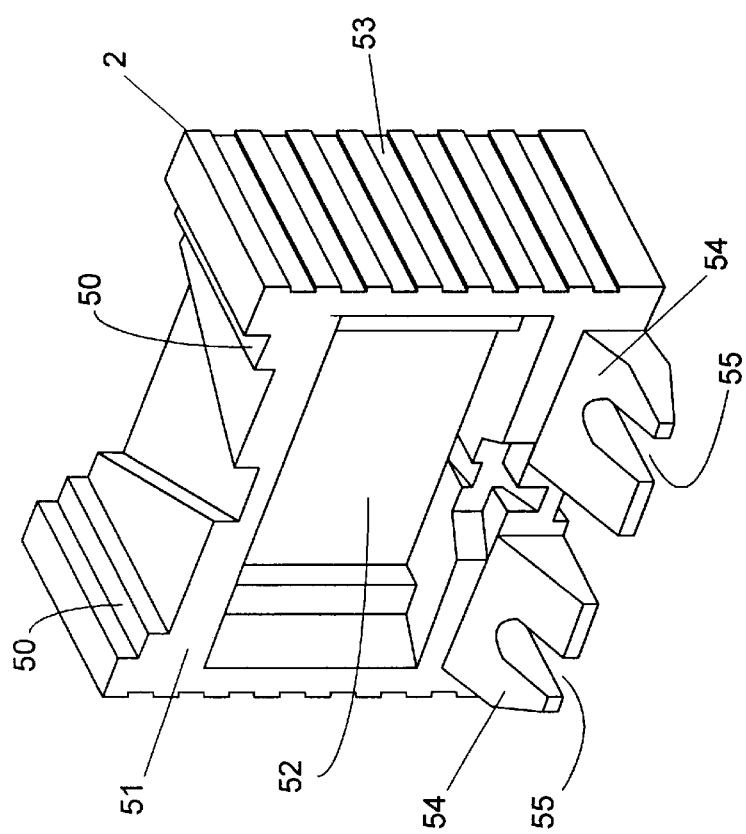
FIG. 12B
FIG. 12A

| | Stress region of $0.4 \times 10^9$ Pa or less |
| --- | --- |
| ▨ | Stress region of more than $0.4 \times 10^9$ Pa |
| ▤ | Stress region of more than $0.8 \times 10^9$ Pa |
| ▨ | Stress region of more than $1.2 \times 10^9$ Pa |

_6,121,614_

1

PYROELECTRIC-TYPE IR RECEIVING ELEMENT AND IR SENSOR USING THE SAME

BACKGROUND OF THE INVENTION

1. Field of the Invention

The present invention relates to a pyroelectric-type IR receiving element for receiving infrared (IR) rays radiated from an object, and an improved IR sensor using the same receiving element.

2. Disclosure of the Related Art

Pyroelectric-type IR receiving elements are used as sensors for detecting a moving object such as a human. For example, a pyroelectric-type IR sensor is shown in FIG. 26. The IR sensor comprises an IR receiving element 100 that is generally known as a dual-type receiving element, a circuit board 120 to which the receiving element is fixed, a base 130 having three output pins 131 projecting downwardly therefrom, and a package cover 140 having an IR transmittable window 141. As shown in FIGS. 27A and 27B, the receiving element 100 comprises a substrate 101 made of a pyroelectric material, a pair of first and second electrodes (102*a*, 103*a*) formed on a top surface of the substrate, and a pair of third and fourth electrodes (102*b*, 103*b*) formed on a bottom surface of the substrate, and a pair of positive and negative output terminals 104 and 105 formed on both of the top and bottom surfaces at opposite ends of the substrate. The substrate 101 is made of a ceramic material such as $PBTiO_3$ or PZT, a single crystal such as $LiTaO_3$, or a high molecular compound such as $PVF_2$. The four electrodes are made of an IR absorbent material such as NiCr or the like, and have the same rectangular shape. The first and second electrodes (102*a*, 103*a*) are arranged such that a longitudinal side of the first electrode extends parallel to that of the second electrode. The third and fourth electrodes (102*b*, 103*b*) are arranged so as to be respectively overlapped with the first and second electrodes (102*a*, 103*a*) through the substrate 101. The first and fourth electrodes (102*a*, 103*b*) are connected to the positive output terminal 104 by conductive patterns 106. Similarly, the second and third electrodes (103*a*, 102*b*) are connected to the negative output terminal 105 by conductive patterns 107. As a result, a pair of IR receiving portions 102 and 103 are defined on the pyroelectric substrate 101. When the IR receiving portions 102 and 103 receive IR rays, the received IR rays are converted to heat energy so that electric charges are generated. According to the electric charges, a voltage-difference signal is obtained from the IR receiving element 100 through a field-effect transistor (FET) 123 and a high resistance element 124, as shown in FIG. 27C. The receiving element 100 is fixed to a pair of stands 121 formed on the circuit board 120 in a bridge fashion. The circuit board 120 mounting thereon the receiving element 100 is attached to the base 130, and then covered by the package cover 140.

To obtain a higher IR sensitivity of the sensor, it is desired to improve light-heat exchange efficiency. For this purpose, a thermal-insulation property of the pyroelectric substrate 101 is improved, and a thin pyroelectric substrate having a thickness of 40 to 100 $\mu m$ has been used in the past. However, since the IR receiving element 100 having such a small thickness is fixed on the stands 121 in the bridge fashion by a conductive bond 150, as shown in FIG. 28A, thermal stress resulting from a difference of thermal expansion coefficients between the pyroelectric substrate 101 and the stand material 121 or the conductive bond 150 is applied to the pyroelectric substrate by a temperature change of the

2 circumference even when no IR rays strike the IR receiving element 100, as shown by a two-way arrow of FIG. 28B. In general, the thermal stress tends to concentrate at defect portions, chipping portions, or micro-cracks in the pyroelectric substrate. This stress concentration brings about the occurrence of undesired electric charges. As a result, there is a problem in that unexpected noise signals generally known as a popcorn noise are output from the IR receiving element.

In the past, it has been proposed to select an adequate combination of the pyroelectric material and the stand material or the conductive bond to reduce the popcorn noise. However, the popcorn noise cannot be sufficiently reduced by only the material selection. Therefore, there is room for further improvement to reduce the popcorn noise.

SUMMARY OF THE INVENTION

A primary object of the present invention is to provide an improved pyroelectric-type IR receiving element capable of reducing the occurrence of popcorn noise while maintaining good IR sensitivity. That is, a pyroelectric material is used as a substrate. The substrate is fixed to a supporting body at its support ends. At least one patch having a substantially rectangular shape is formed in the substrate. The patch is formed on its opposite surfaces with first and second electrodes which are overlapped with each other so as to develop a voltage difference between the first and second electrodes when one of the first and second electrodes receives an IR ray. The substrate has a U-shaped slit composed of a pair of side slits and a base slit connecting the side slits. The U-shaped slit surrounds continuously three sides of the patch, so that the patch is supported by the substrate in a cantilever fashion at a cantilever end which is opposed to one of the support ends of the substrate. In the present invention, since a thermal stress applied to the substrate when the substrate is exposed to a temperature change is efficiently absorbed by the U-shaped slit, stress concentration to be considered is not developed in the patch, so that the occurrence of popcorn noise can be reduced.

It is preferred that both ends of the U-shaped slit are bent toward the inside of the U-shaped slit to obtain a neck portion at the cantilever end. In particular, it is preferred that both ends of the U-shaped slit are formed with rounded holes having a diameter larger than its slit width to obtain a neck portion at the cantilever end. In this case, a thermal stress applied to the cantilever end when the substrate is exposed to a temperature change can be efficiently absorbed by the bent end portions or the rounded holes of the U-shaped slit. As a result, it is possible to further reduce the occurrence of popcorn noise.

It is also preferred that the U-shaped slit is formed in a horseshoe-shaped slit.

A pyroelectric-type IR sensor using the IR receiving element of the present invention comprises a three-dimensional circuit block on which the IR receiving element is mounted, and a package for incorporating the circuit block therein. The circuit block is provided with a pair of stands formed on a top surface of the circuit block. The support ends of the IR receiving element are fixed to the stands such that the IR receiving element extends between the stands in a bridge fashion. At least one electronic component forming a signal treatment circuit for treating a signal provided from the IR receiving element is mounted on a front wall of the circuit block. In this IR sensor, since the IR receiving element mounted on the top surface of the circuit block is spaced away from the electronic components mounted on the front wall, it is possible to minimize a bad influence of heat occurring from the electronic components to the IR receiving element. In addition, since the IR receiving element is supported by the stands in the bridge fashion, it is possible to obtain a sufficient thermal insulation between the IR receiving element and the top surface of the circuit block.

These and still other objects and advantages will become apparent from the following description of the preferred embodiments of the invention when taken in conjunction with the attached drawings.

BRIEF DESCRIPTION OF THE DRAWINGS

FIGS. 12A and 12B are front and rear perspective views of a three-dimensional circuit block of the present invention;

DETAIL DESCRIPTION OF THE PREFERRED EMBODIMENTS

Figure 1:
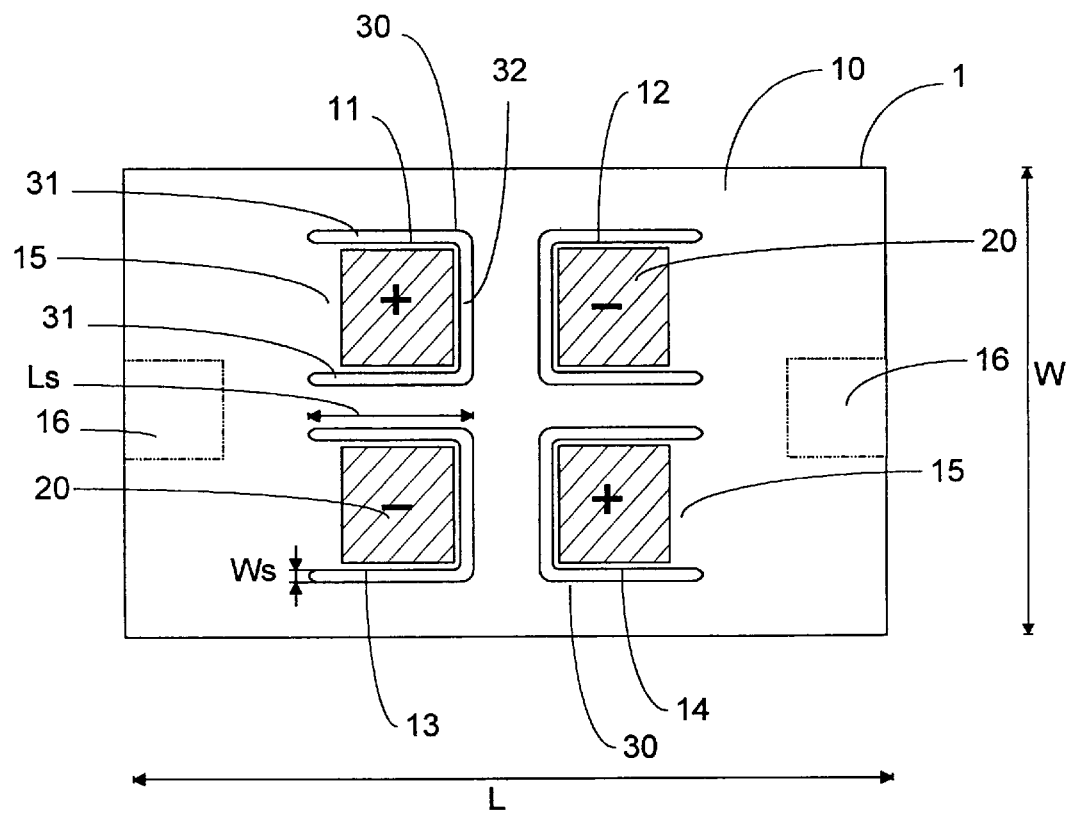
FIG. 1 is an view illustrating a pyroelectric-type IR receiving element according to an embodiment of the present invention.

A pyroelectric-type IR receiving element 1 of the present invention is shown in FIG. 1. A rectangular substrate 10 is made of a pyroelectric material. Two pairs of patches (11 and 12, 13 and 14) having the same rectangular shape are formed in the substrate. Each of the patches 11–14 is formed on its opposite surfaces with first and second electrodes (20, 21) which are overlapped with each other through the patch. Four U-shaped slits 30, each of which is composed of a pair of side slits 31 and a base slit 32 connecting the side slits, are formed in the substrate 10. Each of the U-shaped slits 30 continuously surrounds three sides of the respective patch (11–14), so that the patch is supported by the substrate 10 in a cantilever fashion at a cantilever end 15. The U-shaped slits 30 are arranged such that the base slits 32 for the patches 11 and 13 are respectively opposed to those for the patches 12 and 14, and the side slits 31 extend parallel to each other in a longitudinal direction of the rectangular substrate 10, as shown in FIG. 1. Each of the side slits 31 is connected to the base slit 32 at a rounded corner. In addition, both ends of the side slits 31 of each of the U-shaped slits 30 are formed with rounded ends. In FIG. 1, numeral 16 designates opposite support ends of the substrate 10 at which the IR receiving element 1 is fixed to a pair of stands of a three-dimensional circuit block explained later in a bridge fashion. The cantilever ends 15 of the patches 11 and 13 are opposed to one of the support ends 16, and the cantilever ends 15 of the patches 12 and 14 are opposed to the other support end 16.

Figure 2:
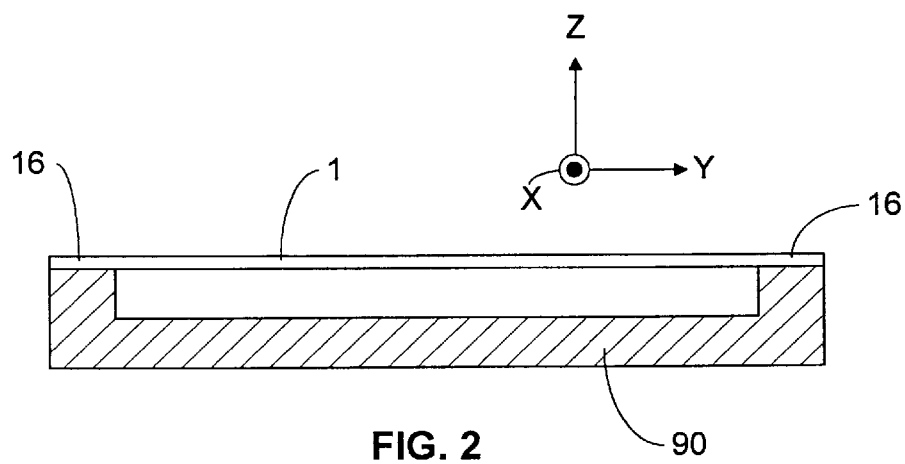
FIG. 2 is a cross section of the receiving element fixed to a supporting body in a bridge fashion.

To show a shock-absorbing capability of the present IR receiving element 1, a drop test of the IR receiving element was simulated. A test sample of an IR receiving element of the present invention has substantially the same shape as the above-explained receiving element 1, and has the following sizes. A length L and width W of the pyroelectric substrate 10 were 5 mm and 2.5 mm, respectively. A length Ls of the side slit 31 and slit width Ws were 0.85 mm and 0.1 mm, respectively. Each of the electrodes 20 and 21 was a square of 0.5 mm×0.5 mm. The IR receiving element 1 was fixed to a supporting body 90 at its support ends 16 in a bridge fashion, as shown in FIG. 2. The simulation analyzed an impact stress applied to the pyroelectric substrate 10 when the supporting body 90 mounting thereon the IR receiving substrate 1 was dropped from a height of 1 m to a concrete floor such that a bottom surface of the supporting body collides against the concrete floor. It was assumed that the acceleration due to gravity was 5000 G. In addition, it was assumed that the collision was an elastic collision, and the IR receiving element 1 was completely fixed to the supporting body 90 with respect to X-, Y- and Z-directions. A finite element method was adopted for this simulation. A comparative IR receiving element 1H, which was substantially equal to the present receiving element 1 except that U-shaped slits 30 were not formed, was prepared and used for the simulation. Results were shown in FIGS. 3 and 4.

Figure 4:
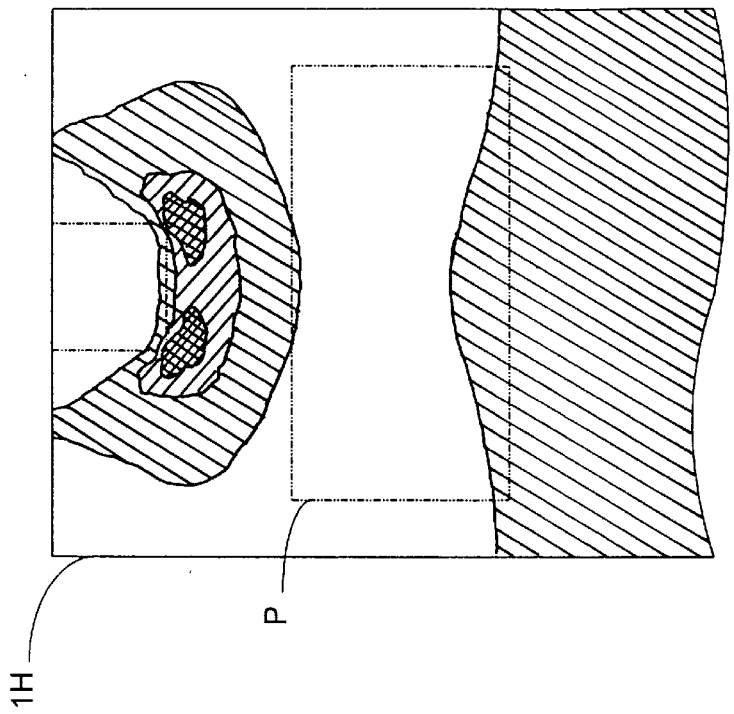
FIG. 4 shows a simulation result of stress distribution of a comparative IR receiving element.
Figure 3:
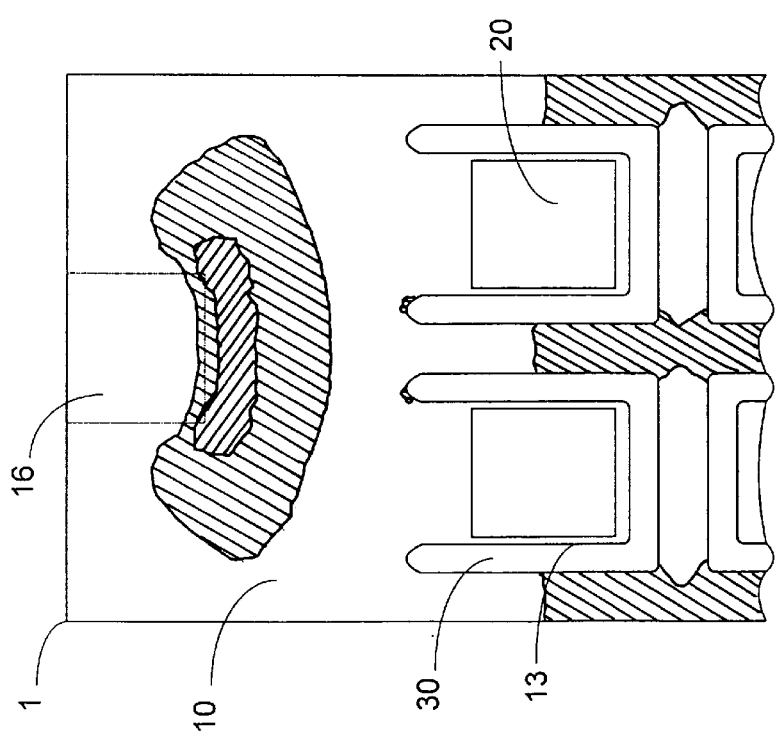
FIG. 3 shows a simulation result of stress distribution of the receiving element of the present invention.

As shown in FIG. 3, no impact stress region of more than $3.0 \times 10^7$ Pa was observed on the patches of the IR receiving element 1. On the other hand, an impact stress region of more than $3.0 \times 10^7$ Pa was observed over a larger surface area of the comparative receiving element 1H including a portion P corresponding to an electrode position, as shown in FIG. 4. These results indicated that an impact stress resulting from the collision can be effectively absorbed by the U-shaped slits 30. In addition, a total amount of impact stress applied to the present test sample was much smaller than that of impact stress applied to the comparative test sample. In particular, impact stress regions of more than $9.0 \times 10^7$ Pa were observed around a support end of the comparative receiving element 1H, however, such a large stress region was not observed on the present IR receiving element 1. As a further advantage of the present invention, it should be noted that the formation of the U-shaped slits 30 brings about a light-weighted IR receiving element.

An impact stress applied to the pyroelectric substrate 10 was simulated as a function of the substrate length L. Results show that when the substrate length L was decreased from 5 mm to 4.5 mm, a maximum impact stress applied to the substrate 10 was reduced by as much as 10%. Therefore, it is preferred to use a pyroelectric substrate of 2.2 mm×4.5 mm to effectively reduce the impact stress when each of the electrodes 20 and 21 has the size of 0.5 mm×0.5 mm.

Figure 5:
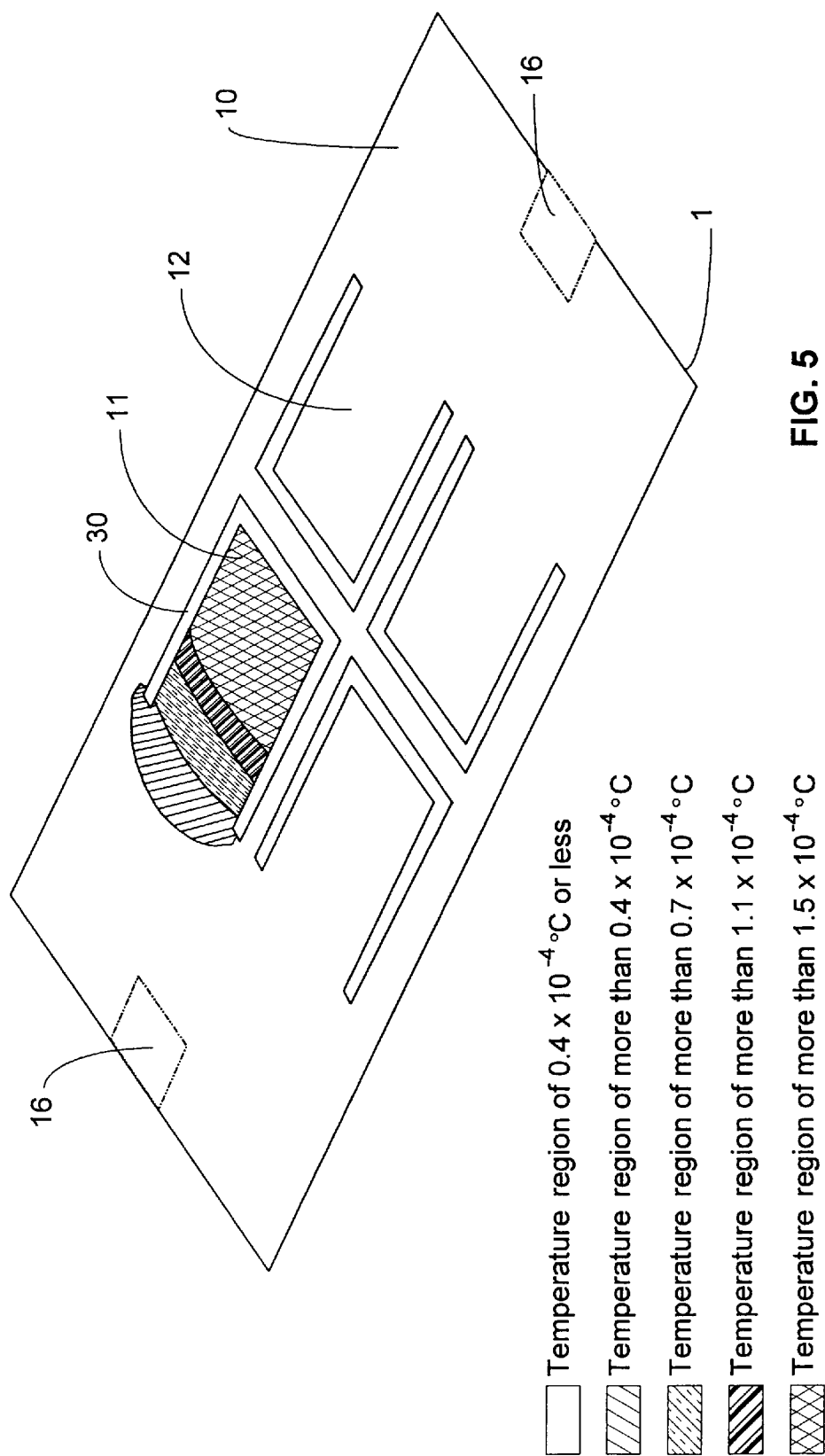
FIG. 5 shows a simulation result of thermal-diffusion distribution of the receiving element of the present invention.

Next, a thermal conductivity of the IR receiving element 1 of the present invention is analyzed by the use of a finite element method. That is, after a heat amount of 0.1 $\mu$W is provided to the patch 11, a thermal-diffusion distribution is determined when the substrate reaches a thermally steady state. The result is shown in FIG. 5. It shows that a temperature region of more than $0.4 \times 10^{-4}$° C. does not reach the support end 16. Therefore, it is possible to reduce the substrate length L as long as the temperature region is spaced away from the support end 16. From results of further simulations, a minimum length of the IR receiving element 1 having four U-shaped slits 30 of 4.5 mm was obtained. According to these simulations, it has been experimentally confirmed that the present IR receiving element 1 having the length of 4.5 mm exhibits excellent IR sensitivity while preventing the occurrence of popcorn noise without causing any problem in its thermal properties.

Figure 6:
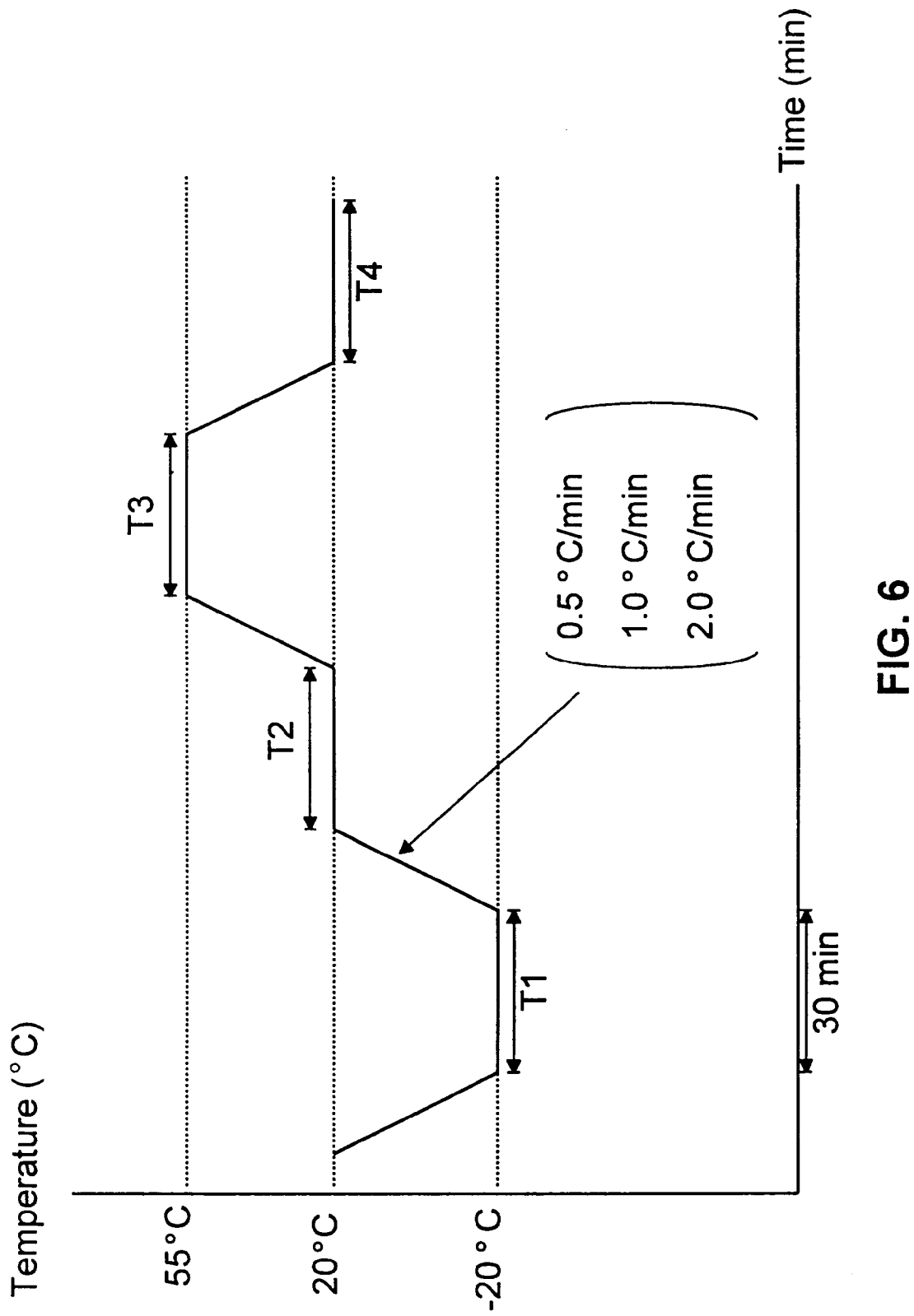
FIG. 6 is a diagram explaining a heat-cycle test for checking the occurrence of popcorn noise.

Heat-cycle tests were carried out to compare the occurrence of popcorn noise in the IR receiving element 1 of the present invention with the comparative IR receiving element 1H. Those samples were sealed in a test room, and then a temperature in the test room was changed along a heat-cycle curve shown in FIG. 6. Each of keep times T1 to T4 was 30 min. In the heat-cycle tests, three temperature gradients of 0.5° C./min, 1° C./min, and 2° C./min, were adopted. The occurrence of popcorn noise was checked during the respective heat-cycle test. Results show that the occurrence of popcorn noise in the IR receiving element 1 is reduced irrespective of the temperature gradients, as compared with the comparative IR receiving element 1H.

Figure 7A:
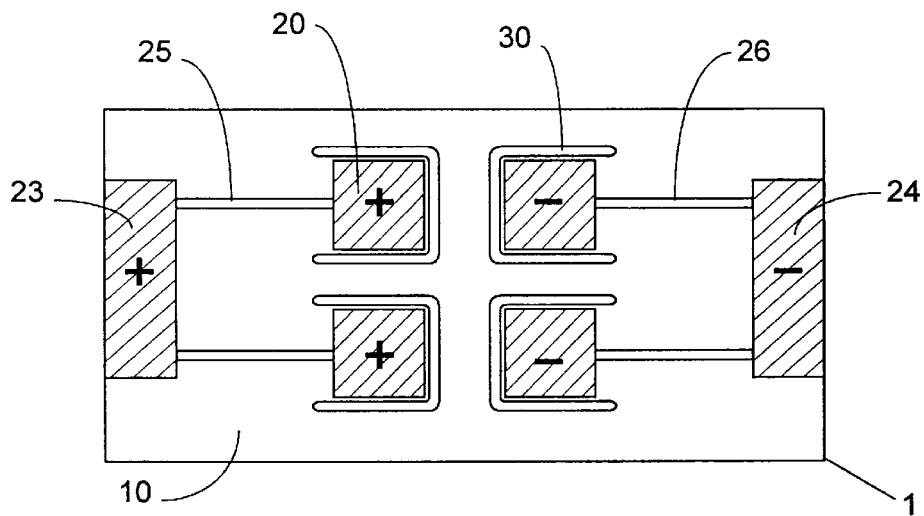
FIGS. 7A and 7B respectively show conductive patterns on top and bottom surfaces of the IR receiving element of the present invention.
Figure 7B:
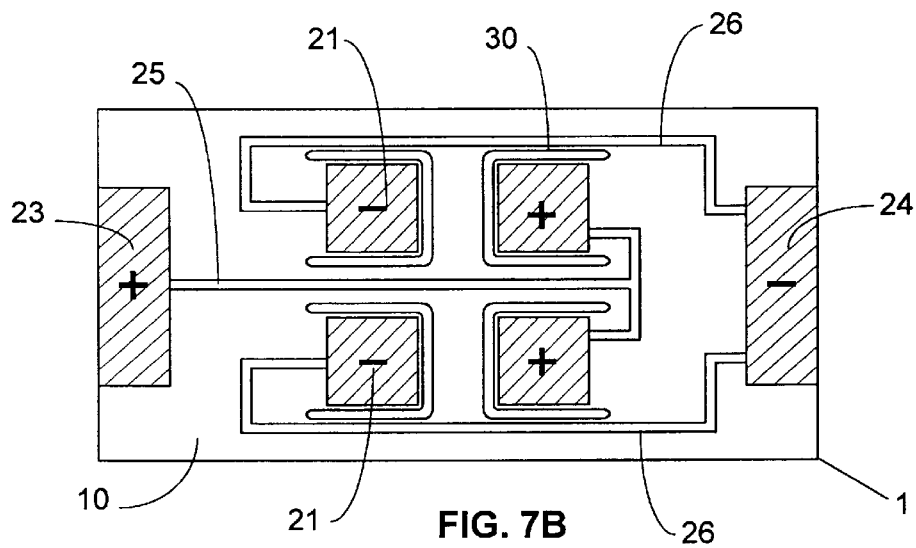
Figure 7C:
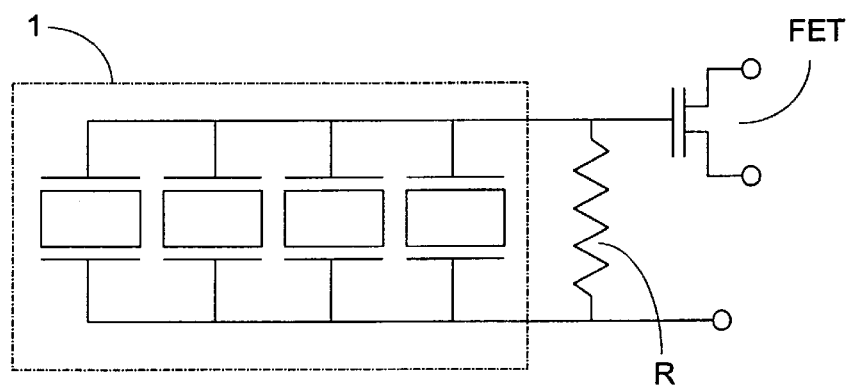
FIG. 7C is a circuit diagram showing a wiring pattern of the receiving element with a field-effect transistor and high resistance element.
Figure 8A:
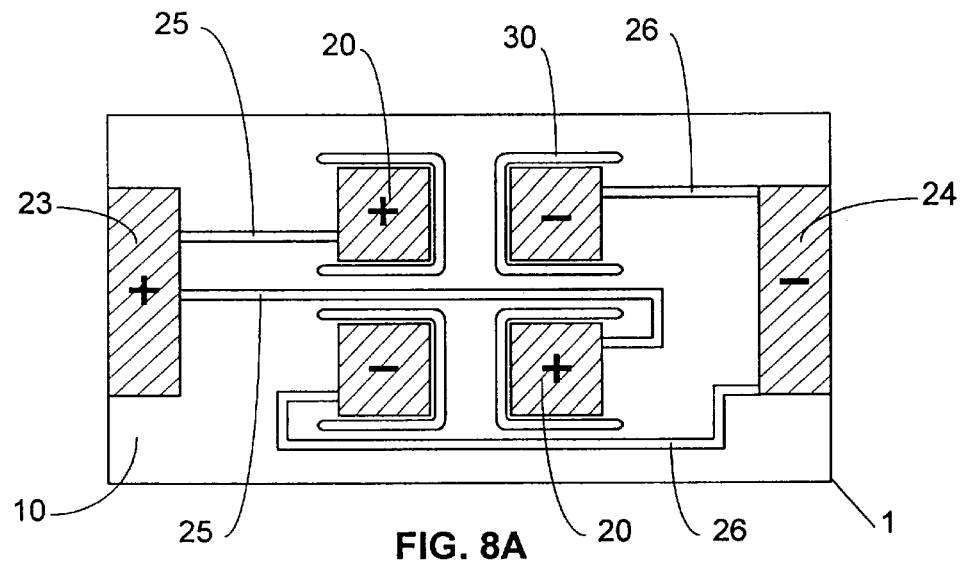
FIGS. 8A and 8B respectively show conductive patterns on top and bottom surfaces of an IR receiving element of the present invention.
Figure 8B:
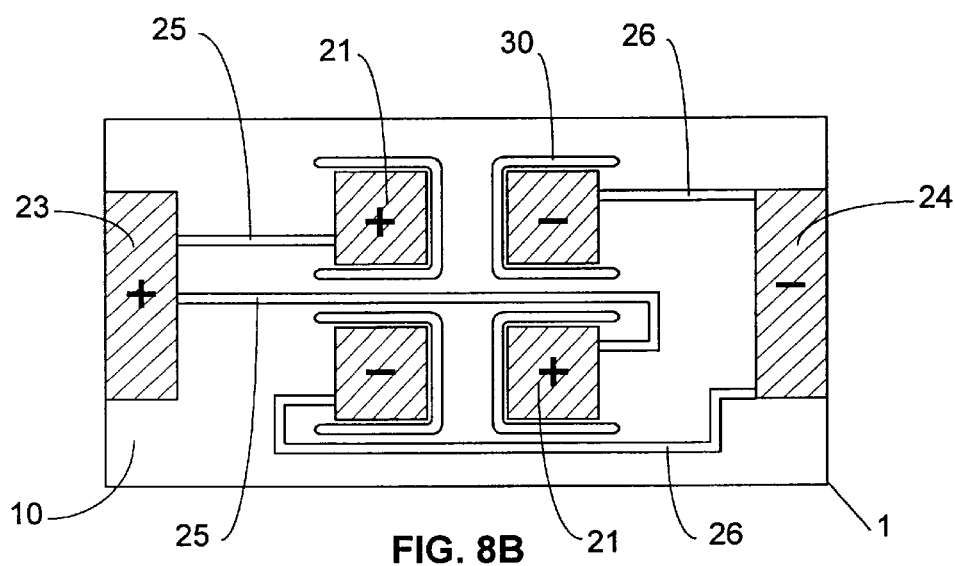
Figure 8C:
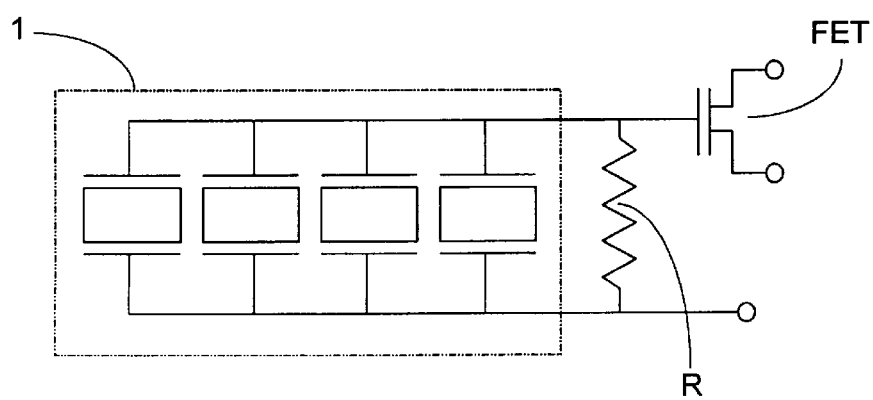
FIG. 8C is a circuit diagram showing a wiring pattern of the receiving element with a field-effect transistor and high resistance element.
Figure 9A:
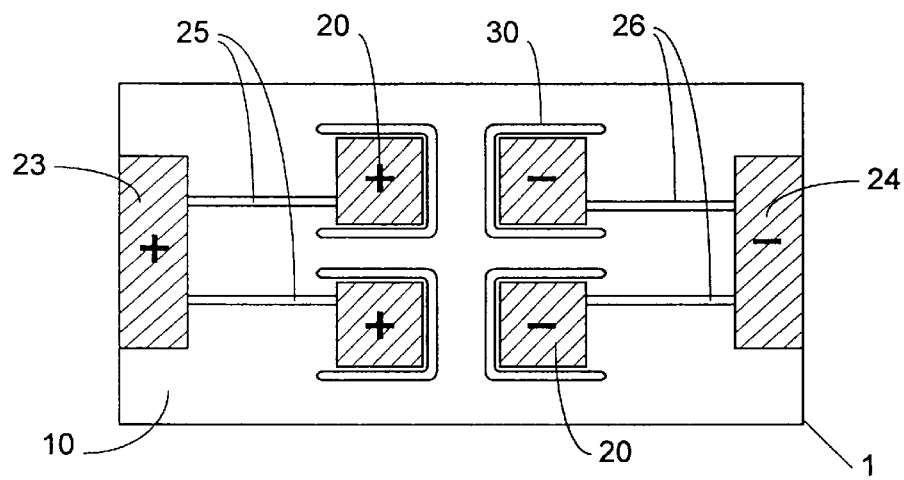
FIGS. 9A and 9B respectively show conductive patterns on top and bottom surfaces of an IR receiving element of the present invention.
Figure 9B:
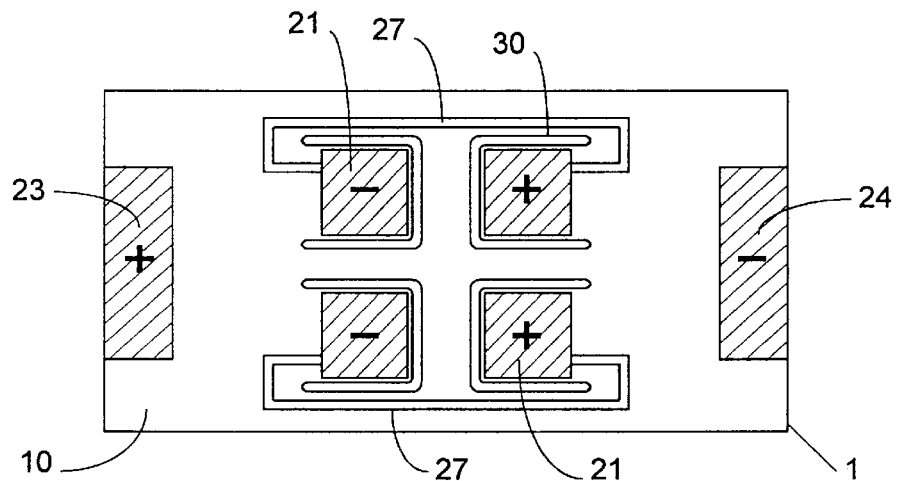
Figure 9C:
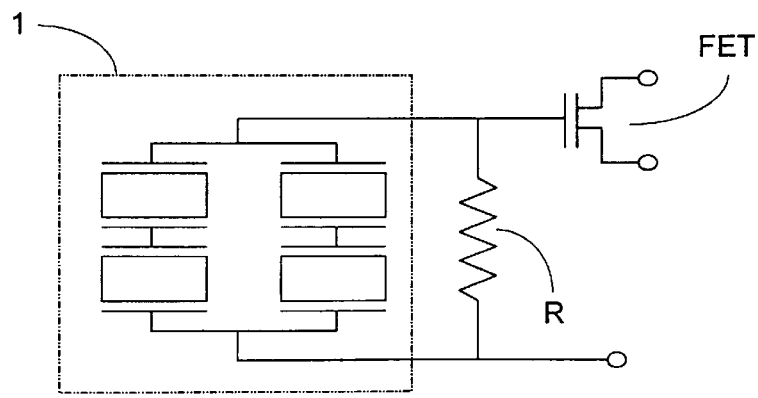
FIG. 9C is a circuit diagram showing a wiring pattern of the receiving element with a field-effect transistor and high resistance element.
Figure 10A:
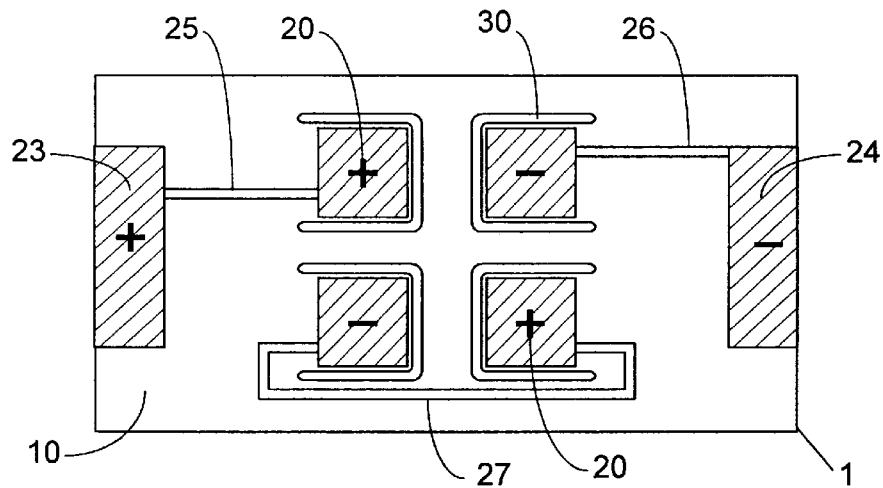
FIGS. 10A and 10B respectively show conductive patterns on top and bottom surfaces of an IR receiving element of the present invention.
Figure 10B:
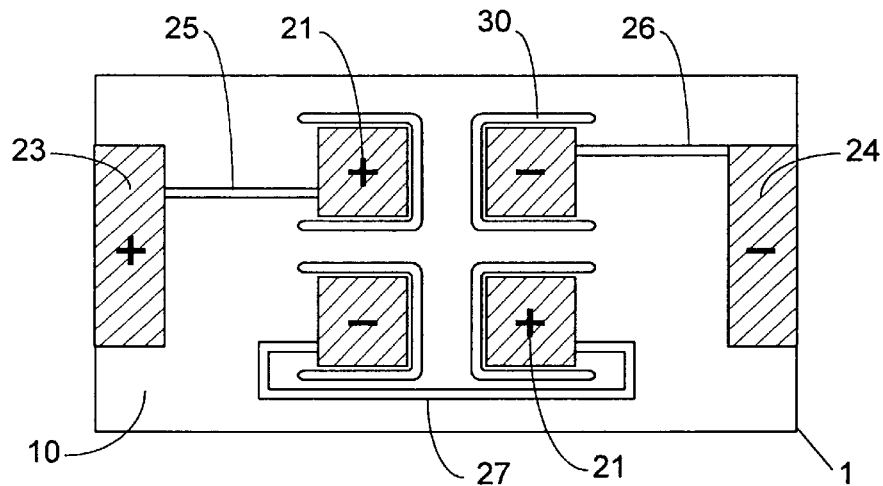
Figure 10C:
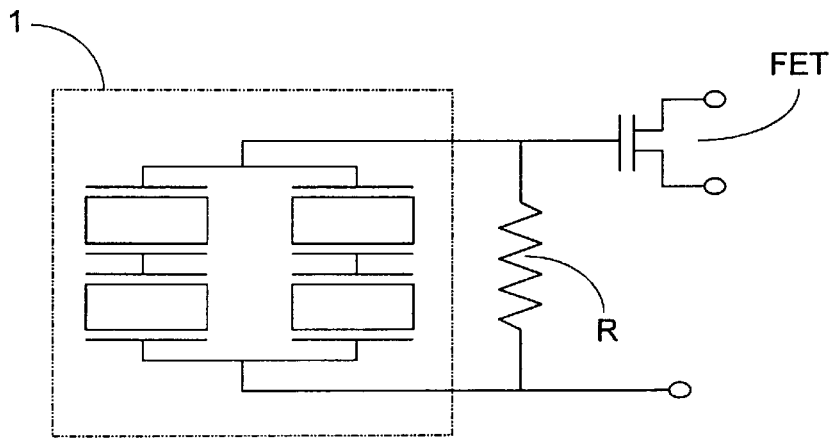
FIG. 10C is a circuit diagram showing a wiring pattern of the receiving element with a field-effect transistor and high resistance element.

In a practical use of the IR receiving element 1 of the present invention, a pair of positive and negative output terminals 23 and 24 are formed at opposite ends on both of the top and bottom surfaces of the pyroelectric substrate 10. The output terminals 23 and 24 are connected to the first and second electrodes (20, 21) by conductive patterns 25 and 26, as shown in FIGS. 7A and 7B. FIG. 7A shows the conductive patterns on the top surface of the substrate 10. FIG. 7B shows the conductive patterns on the bottom surface of the substrate 10. FIG. 7C is a circuit diagram showing a wiring pattern of the IR receiving element 1 with a field-effect transistor FET and a high resistance element R. As first to third modifications of the IR receiving element 1, it is possible to adopt conductive patterns shown in FIGS. 8A to 8C, FIGS. 9A to 9C, or FIGS. 10A to 10C. In FIGS. 9B, 10A and 10B, numeral 27 designate a conductive pattern connecting between the opposed electrodes on the same surface. Thus, IR receiving elements having various conductive patterns of the present invention can be used as pyroelectric-type IR sensors.

Next, a method of fabricating a pyroelectric-type IR receiving element of the present invention is explained. Desired resist patterns are formed on top and bottom surfaces of a pyroelectric substrate, for example, a single crystal of LiTaO$_3$ having a thickness of 40 $\mu$m. An IR absorbent material is deposited on the substrate surfaces according to the resist patterns to obtain conductive patterns including a first electrode on the top surface and a second electrode on the bottom surface. The first and second electrodes are overlapped with each other through the substrate. When the IR absorbent material is NiCr, it is preferred that a thickness of the respective electrode is determined in a range of about 200 to 500 angstroms. Subsequently, a U-shaped slit is formed in the substrate so as to continuously surround three sides of the first and second electrodes by sandblasting. The conductive patterns are protected by the use of a photosensitive dry-film resist during the sandblasting. A dry etching process such as ion milling, or wet etching process can be adopted to form the U-shaped slit, however, the sandblasting method is the most preferable to efficiently and accurately form the U-shaped slit in the substrate. When the IR receiving element is a rectangular shape of 2.5 mm×5.0 mm, hundreds of the IR receiving elements can be obtained at once from a 3-inch wafer of LiTaO$_3$.

Figure 11:
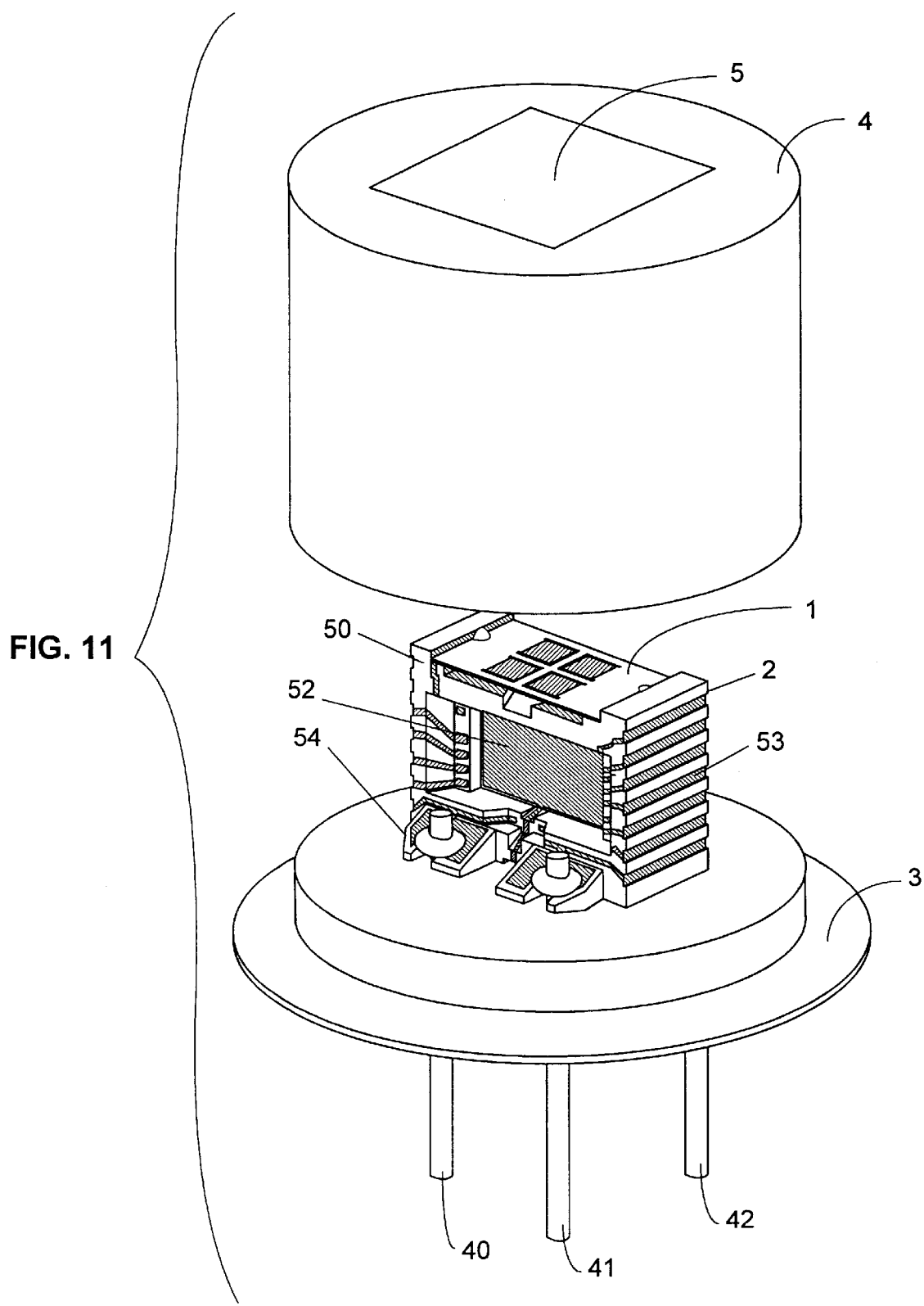
FIG. 11 is an exploded perspective view of an IR sensor of the present invention.
Figure 13:
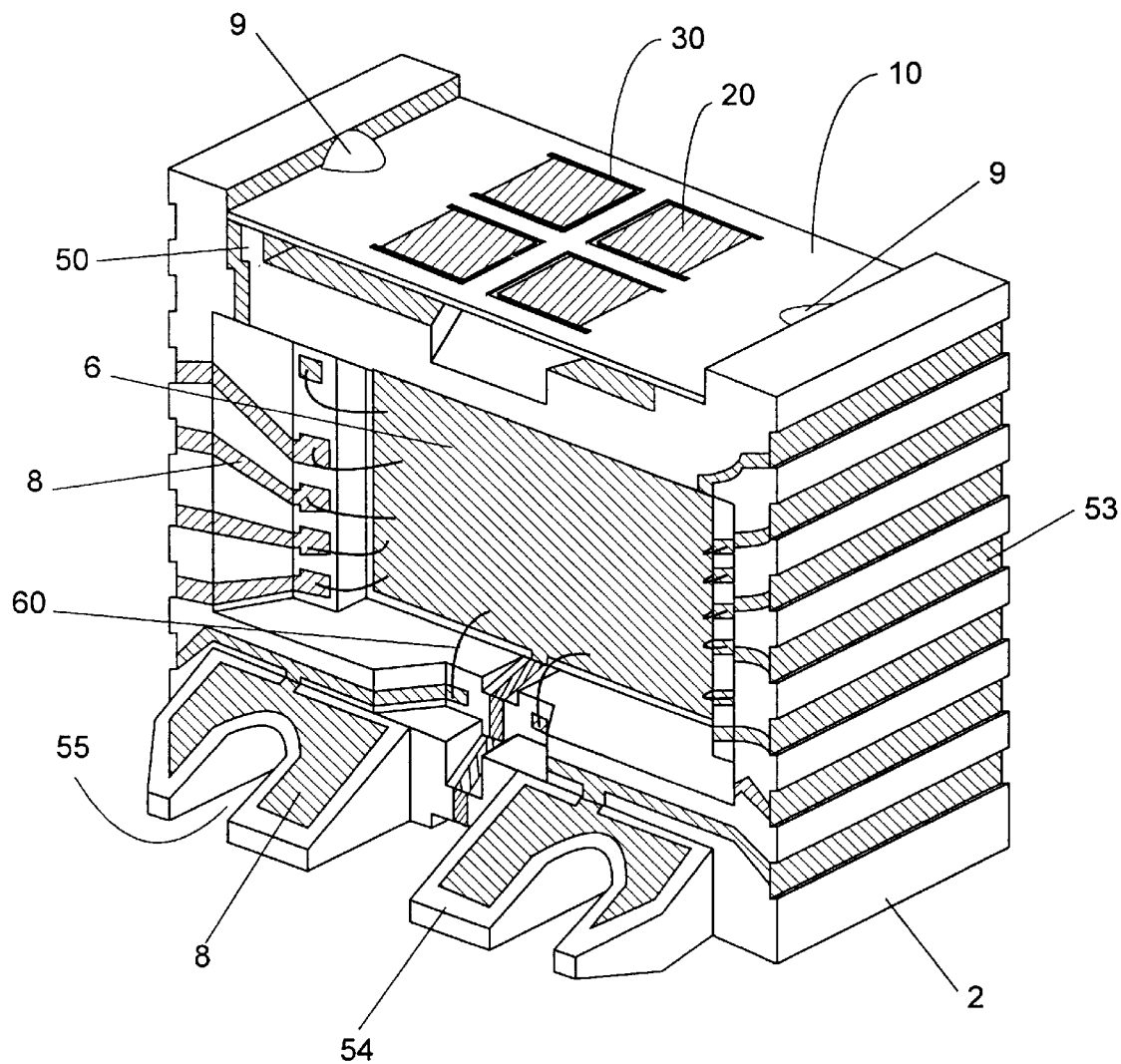
FIG. 13 is a perspective view of the circuit block mounting thereon an IR receiving element of the present invention.
Figure 14:
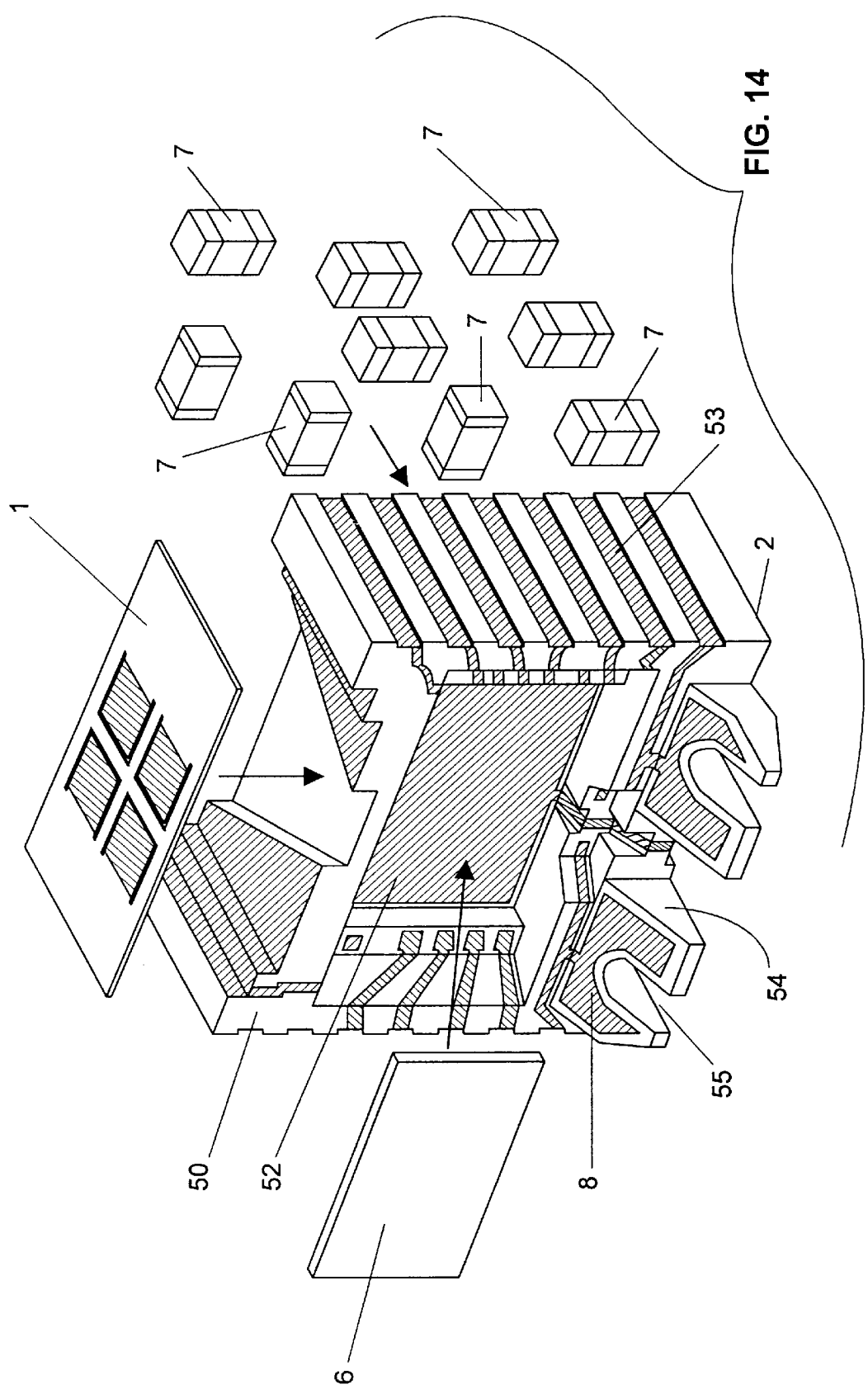
FIG. 14 is an exploded perspective view of the circuit block of FIG. 13.

An IR sensor using the present IR receiving element 1 is shown in FIG. 11. That is, the IR sensor comprises the IR receiving element 1, a three-dimensional circuit block 2 on which the IR receiving element is mounted, a base plate 3 having three projecting pins 40 to 42, and a cover 4 having an IR transmittable window 5 on its top surface. As shown in FIGS. 12A and 12B, the circuit block 2 is formed with a pair of stands 50 formed on its top surface, a front wall 51 having an IC chip supporting portion 52, a pair of side walls having a plurality of grooves 53 extending between the front wall 51 and a rear wall 56, and a pair of stabilizers 54 each having a notch 55 which are formed at a lower side of the front wall 51. The circuit block 2 is integrally molded with an electrically-insulating resin having a low thermal conductivity. The IR receiving element 1 is fixed to the stands 50 at the support ends 16 by a conductive bond 9 so as to extend between the stands in a bridge fashion, as shown in FIGS. 13 and 14. Since the IR receiving element 1 is supported in the bridge fashion, sufficient thermal insulation is obtained between the circuit block 2 and the IR receiving element 1, and at the same time noises resulting from unbalanced voltage can be prevented. An IC chip 6 for treating a signal provided from the IR receiving element 1 is attached to the chip supporting portion 52. Electronic components 7 such as condensers, resistors, and field-effect transistors, are mounted on the rear wall 56. The IC chip 6 is electrically connected to the electronic components 7 through conductive patterns 8 formed on the front wall 51 and the grooves 53 in the side walls. After the projecting pins 40 and 41 are abutted against the inner surfaces of the notches 55, they are electrically connected to conductive patterns 8 formed on the stabilizers 54 by a conductive bond. At the same time, the circuit block 2 is mechanically connected to the base plate 3 by the conductive bond, as shown in FIG. 11. The projecting pin 42 is used as ground. In FIG. 13, numeral 60 designates wires connecting between the IC chip 6 and the conductive patterns 8 formed on the front wall 51 of the circuit block 2.

Figure 15:
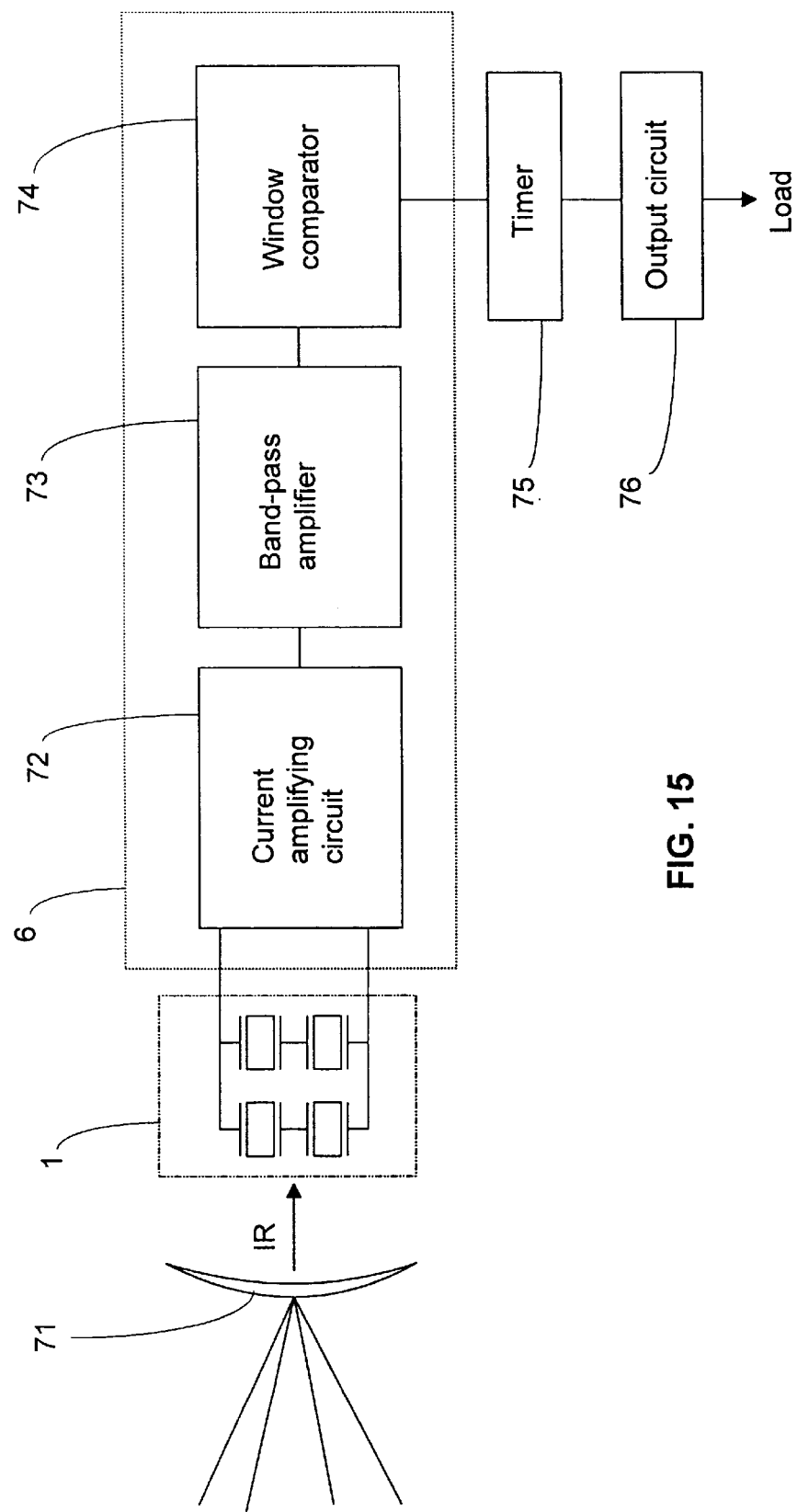
FIG. 15 is a schematic circuit diagram of the IR sensor.

Next, an operation mechanism of the present IR sensor is briefly explained referring to FIG. 15. When the IR receiving element 1 receives IR rays, an output signal is provided from the IR receiving element 1 to a current amplifying circuit 72. Then, a signal having a required frequency is extracted from the amplified signal by a band-pass amplifier 73. The extracted signal is sent to a window comparator 74 in which a threshold value is predetermined. When the extracted signal is greater than the threshold value, a detection signal is output from the comparator 74. According to the detection signal, an output circuit 76 applies a load to an electric apparatus such as lights for a time period predetermined by a timer 75. In FIG. 15, numeral 71 designates a condenser of IR rays. When the current amplifying circuit 72, band-pass amplifier 73, and the comparator 74 are incorporated in the IC chip 6, it is possible to use a chip ceramic condenser having a relatively small capacity as well as Al(aluminum) electrolytic condenser or Ta(tantalum) condenser having a relatively large capacity. In addition, it is possible to mount an IC chip incorporating only the band-pass amplifier 73 and window comparator 74 on the chip supporting portion 52. In this case, a field-effect transistor and high resistance element are mounted on the rear wall 56 of the circuit block 2. Moreover, when an IC chip incorporating therein only the current amplifying circuit 72 and band-pass amplifier 73 is mounted on the chip supporting portion 52, an analog signal can be output from the projecting pins 40 and 41 of the base plate 3. Thus, an adequate IC chip may be mounted on the circuit block 2 in accordance with the circumstances.

Figure 16:
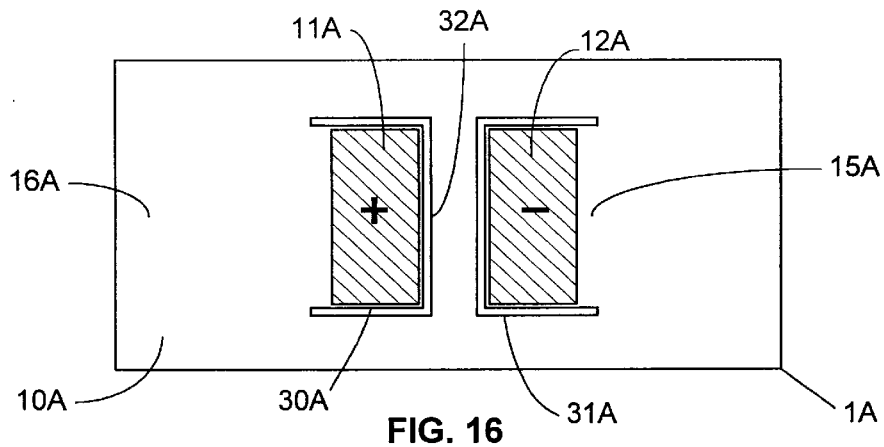
FIG. 16 is a plan view illustrating a pyroelectric-type IR receiving element of the present invention.
Figure 17A:
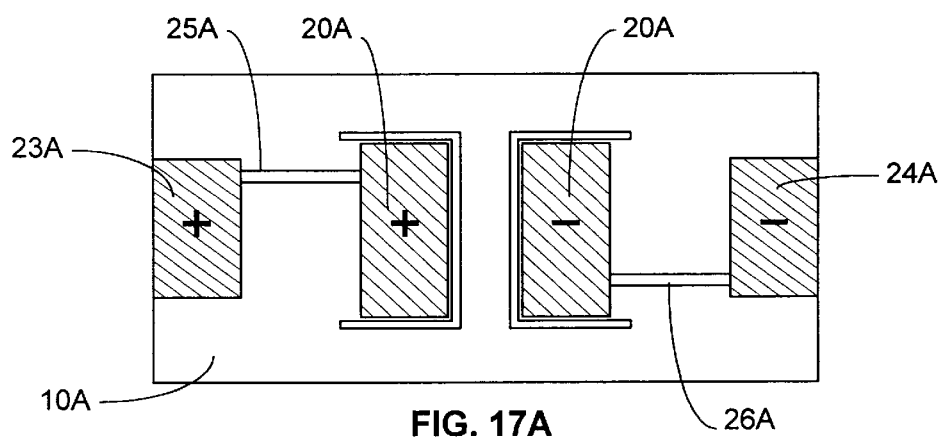
FIGS. 17A and 17B respectively show conductive patterns formed on top and bottom surfaces of the IR receiving element.
Figure 17B:
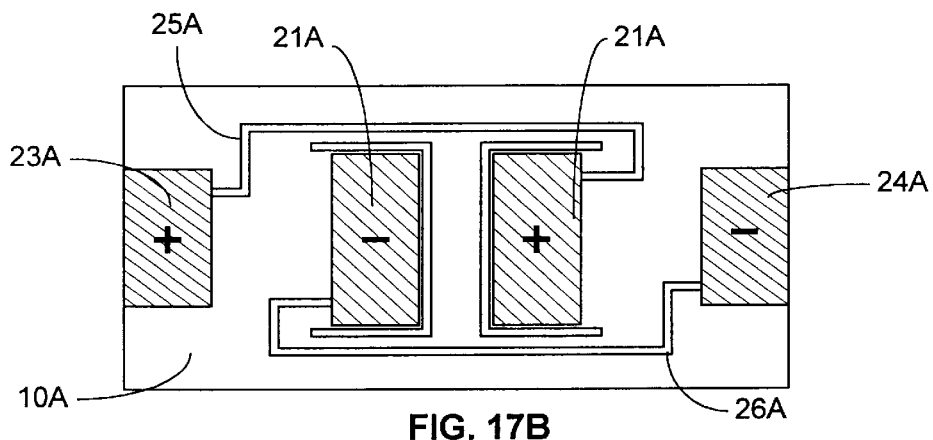
Figure 17C:
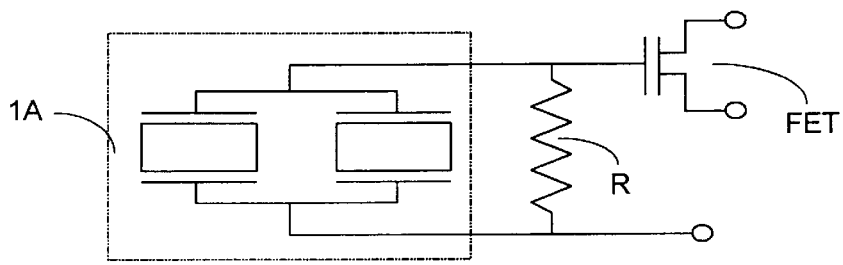
FIG. 17C is a circuit diagram showing a wiring pattern of the receiving element with a field-effect transistor and high resistance element.
Figure 18A:
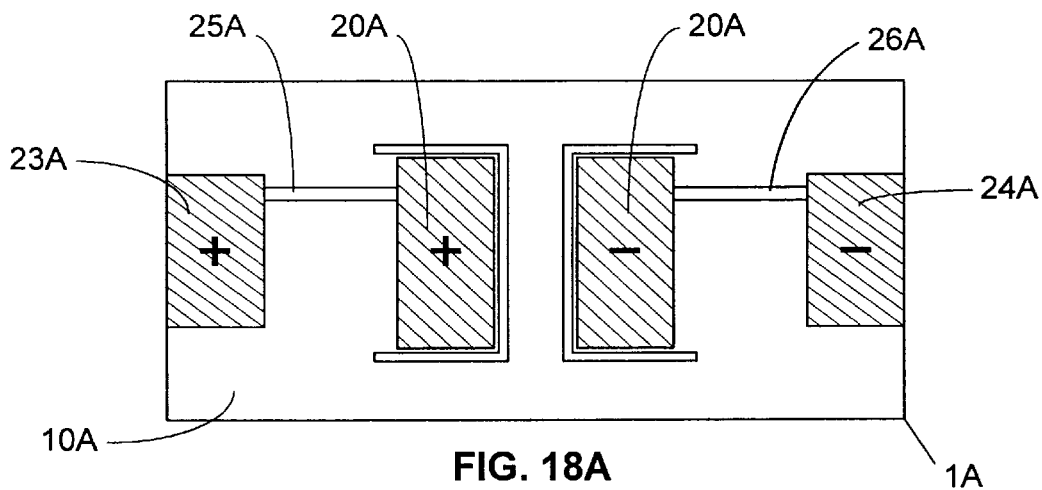
FIGS. 18A and 18B respectively show conductive patterns formed on top and bottom surfaces of the IR receiving element.
Figure 18B:
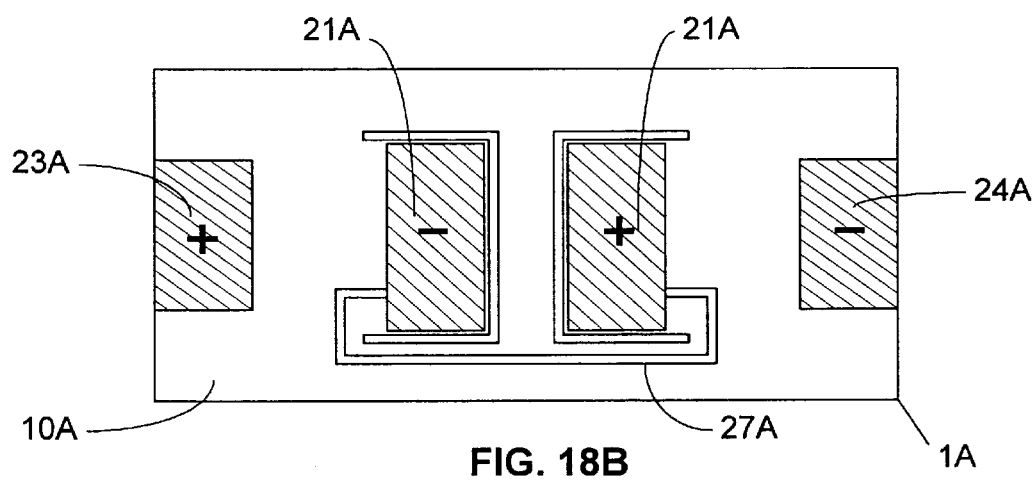
Figure 18C:
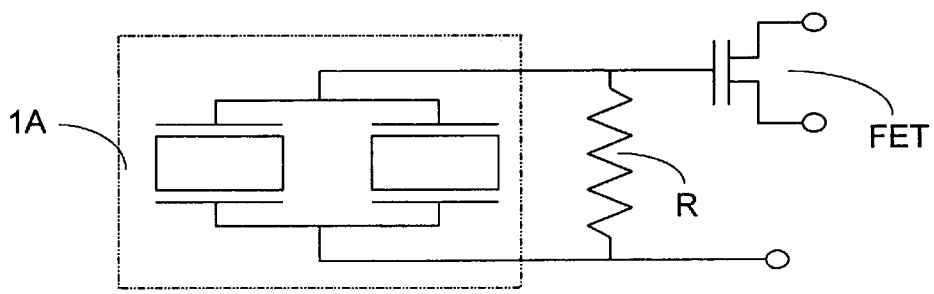
FIG. 18C is a circuit diagram showing a wiring pattern of the receiving element with a field-effect transistor and a high resistance element.

As a fourth modification of the IR receiving element 1, a pyroelectric-type IR receiving element 1A is shown in FIG. 16. The IR receiving element 1A is substantially same as that of the above embodiment except that only one pair of patches 11A and 12A are formed in a pyroelectric substrate 10A. Therefore, no duplicate explanation of common parts is deemed necessary. Like parts are designated by like numerals with a suffixed letter of "A". As an example, conductive patterns formed on top and bottom surfaces of the IR receiving element 1A are shown in FIGS. 17A and 17B, respectively. FIG. 17C shows a wiring pattern of the IR receiving element 1A with a field-effect transistor FET and high resistance element R. Alternatively, it is possible to use conductive patterns shown in FIGS. 18A and 18B, and a wiring pattern shown in FIG. 18C.

Figure 19:
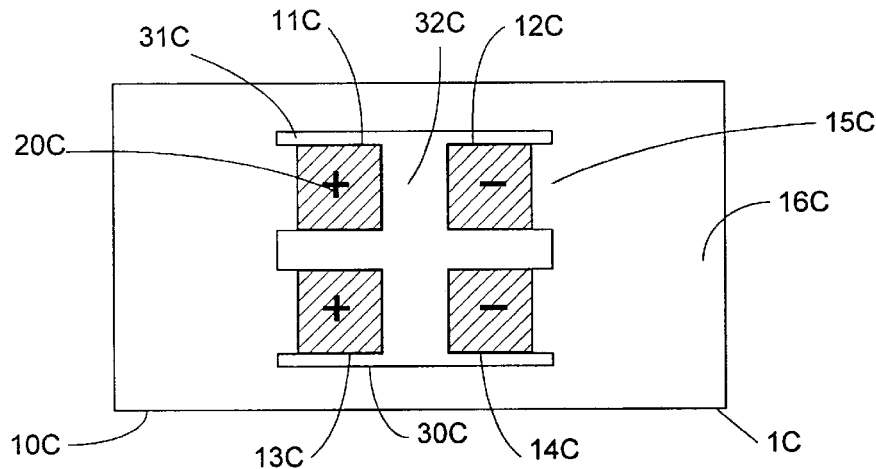
FIG. 19 is a plan view illustrating a pyroelectric-type IR receiving element of the present invention.

As a fifth modification of the IR receiving element 1, a pyroelectric-type IR receiving element 1C is shown in FIG. 19. The IR receiving element 1C is substantially same as that of the above embodiment except that patches 11C and 13C are opposed to the patches 12C and 14C through a common base slit 32C, and the patches 11C and 12C are opposed to the patches 13C and 14C through common side slits 31C, respectively. Therefore, no duplicate explanation of common parts is deemed necessary. Like parts are designated by like numerals with a suffixed letter of "C".

Figure 20:
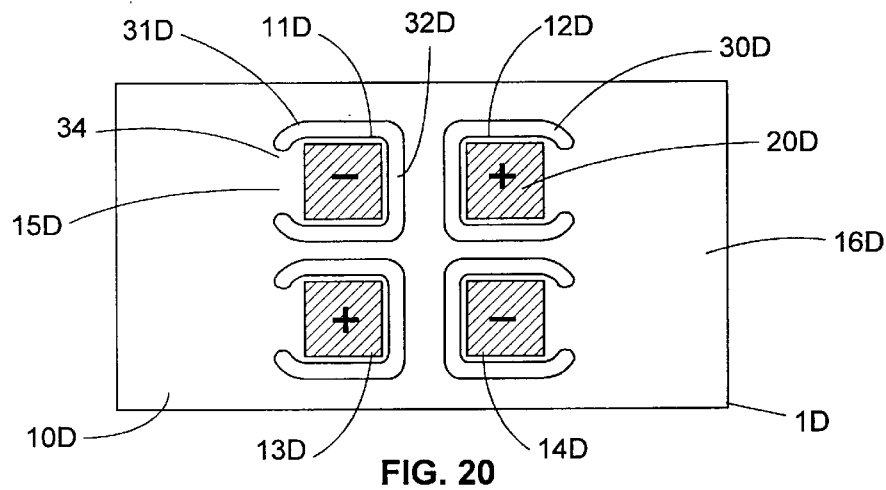
FIG. 20 is a plan view illustrating a pyroelectric-type IR receiving element of the present invention.

As a sixth modification of the IR receiving element 1, a pyroelectric-type IR receiving element 1D is shown in FIG. 20. The IR receiving element 1D is substantially the same as that of the above embodiment except that both ends of each of U-shaped slits 30D are bent toward the inside of the U-shaped slit 30D to obtain a neck portion 34 at a cantilever end 15D. Therefore, no duplicate explanation of common parts is deemed necessary. Like parts are designated by like numerals with a suffixed letter of "D".

Figure 21:
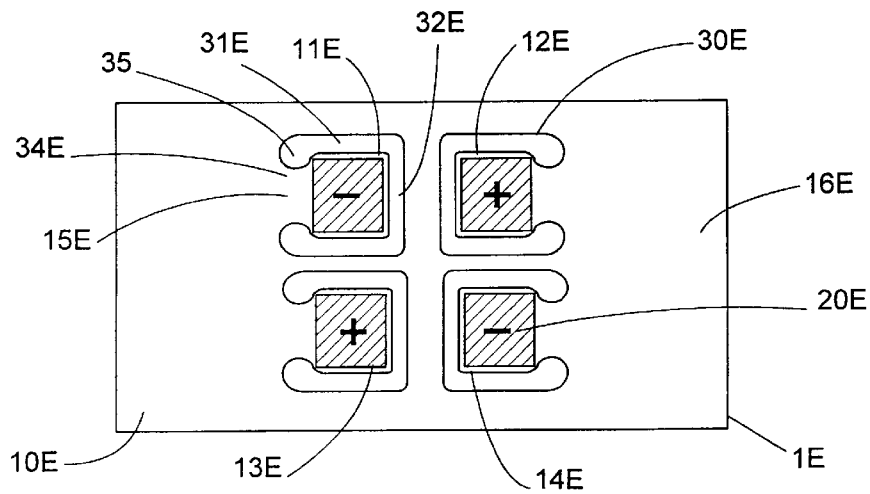
FIG. 21 is a plan view illustrating a pyroelectric-type IR receiving element of the present invention.

As a seventh modification of the IR receiving element 1, a pyroelectric-type IR receiving element 1E is shown in FIG. 21. The IR receiving element 1E is substantially same as that of the above embodiment except that both ends of each of U-shaped slits 30E are formed with rounded holes 35 having a diameter larger than its slit width to obtain a neck portion 34E at a cantilever end 15E. Therefore, no duplicate explanation of common parts is deemed necessary. Like parts are designated by like numerals with a suffixed letter of "E".

Figure 22:
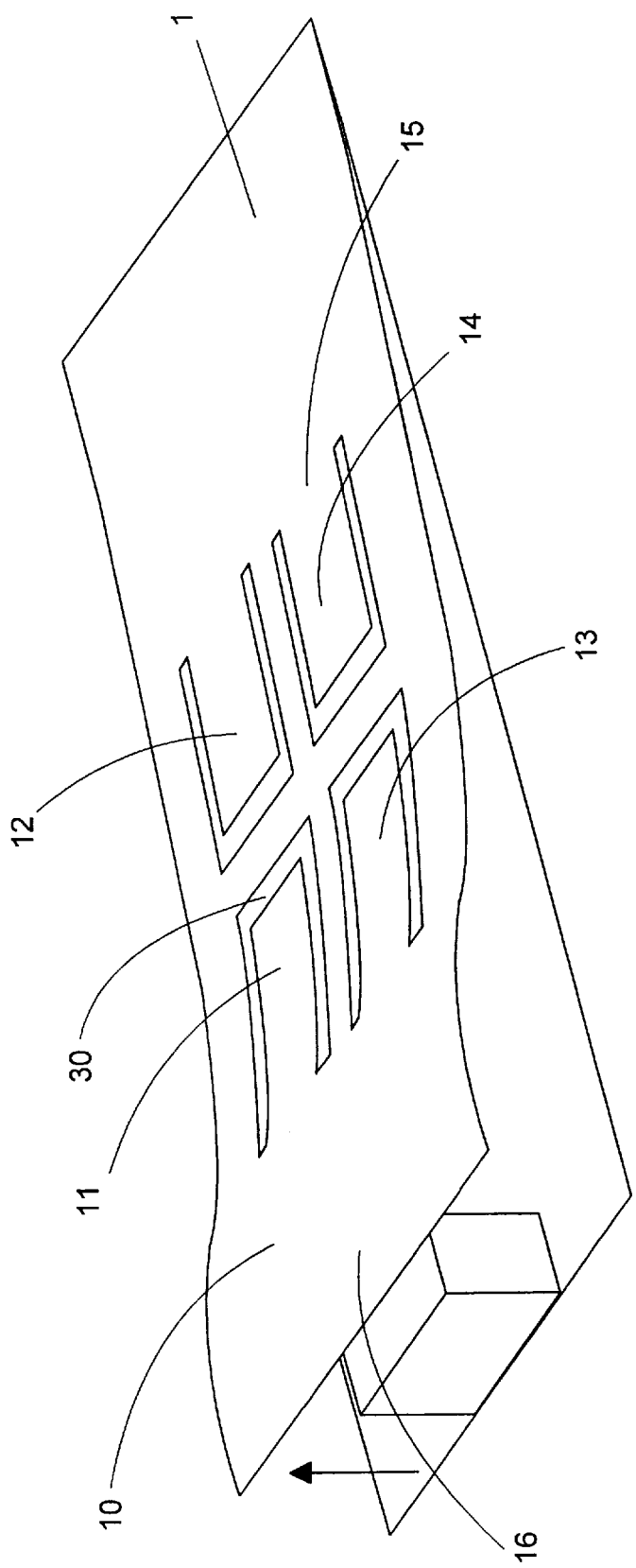
FIG. 22 is a perspective view explaining a simulation test for analyzing stress absorbing capability of an IR receiving element.
Figure 23:
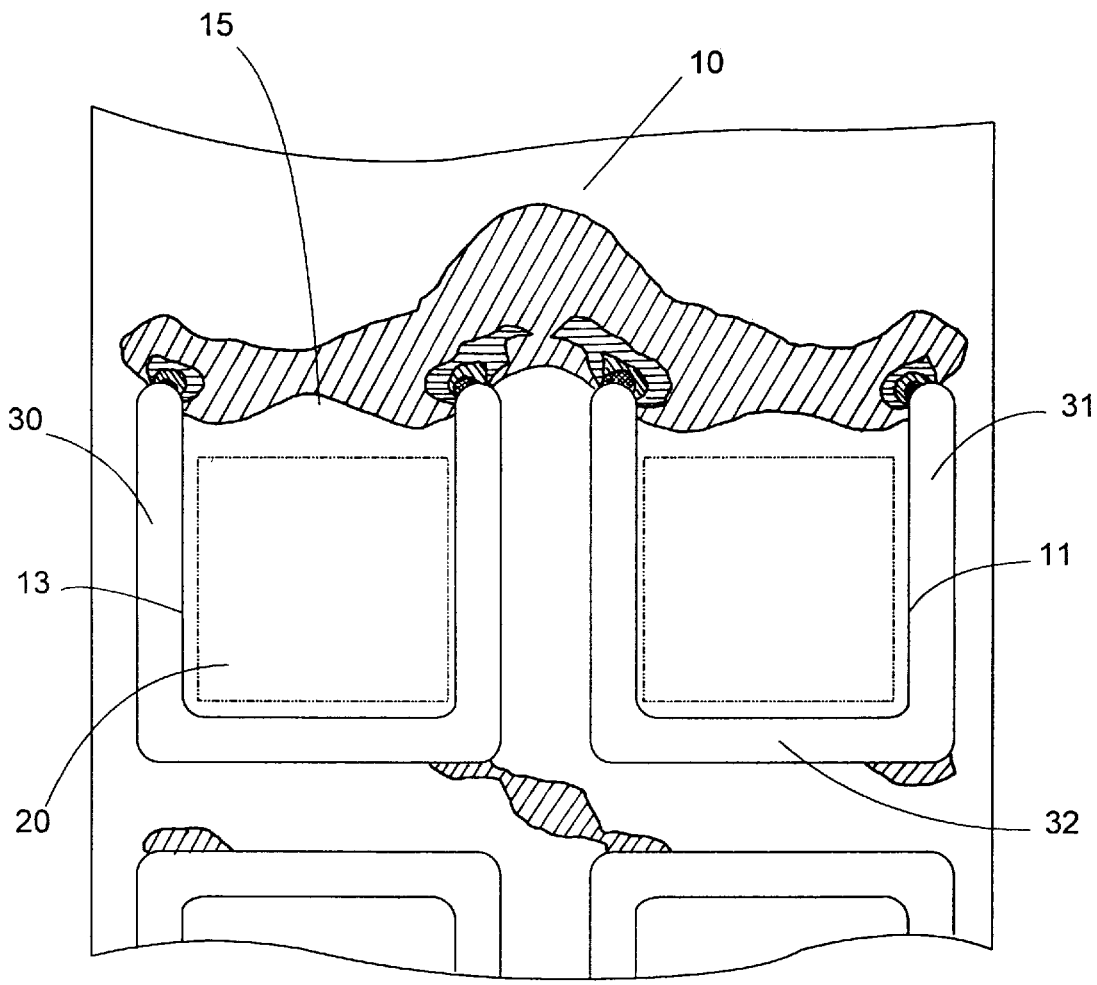
FIG. 23 shows a simulation result of stress distribution of the IR receiving element of FIG. 1.
Figure 24:
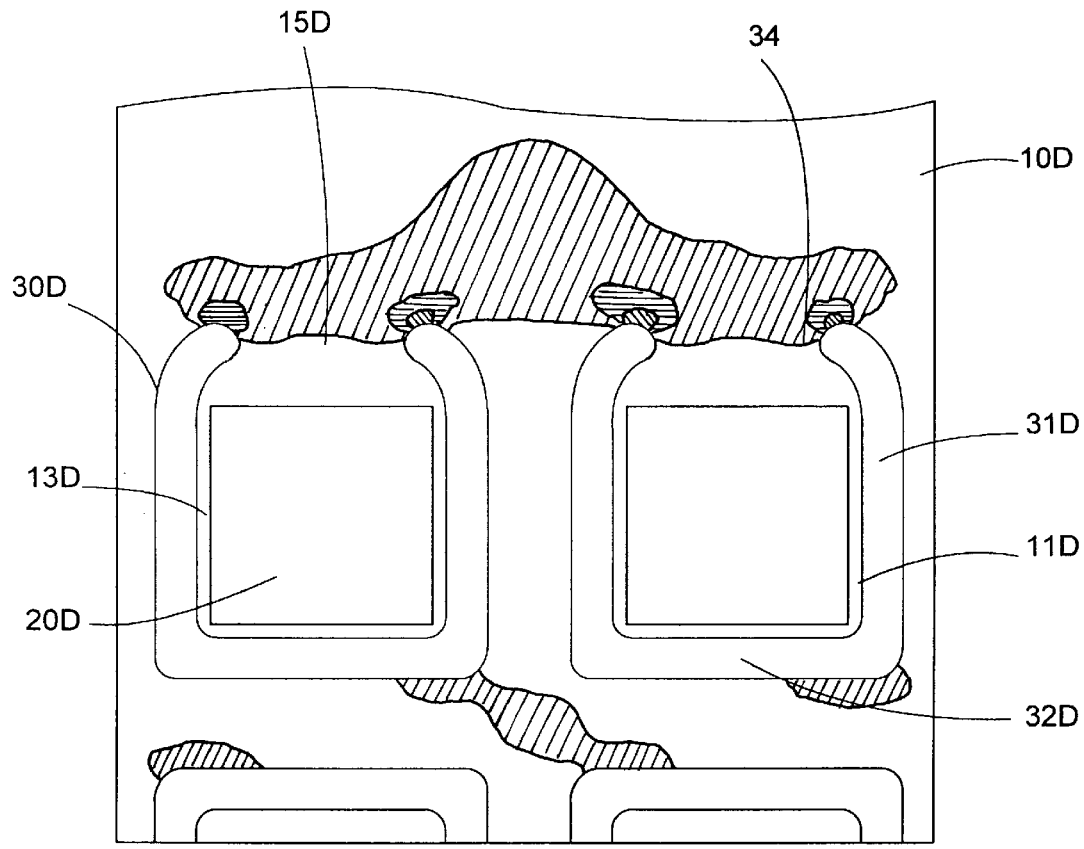
FIG. 24 shows a simulation result of stress distribution of the IR receiving element of FIG. 20.
Figure 25:
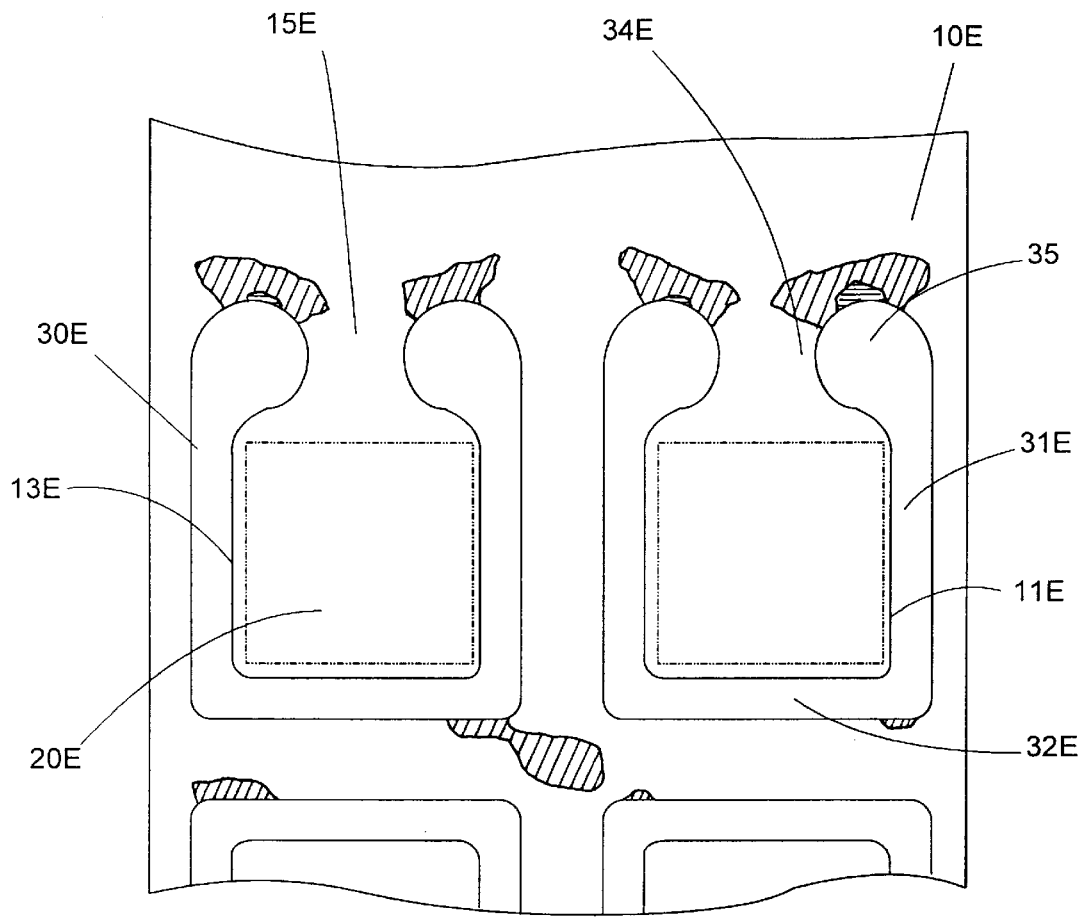
FIG. 25 shows a simulation result of stress distribution of the IR receiving element of FIG. 21.
Figure 26:
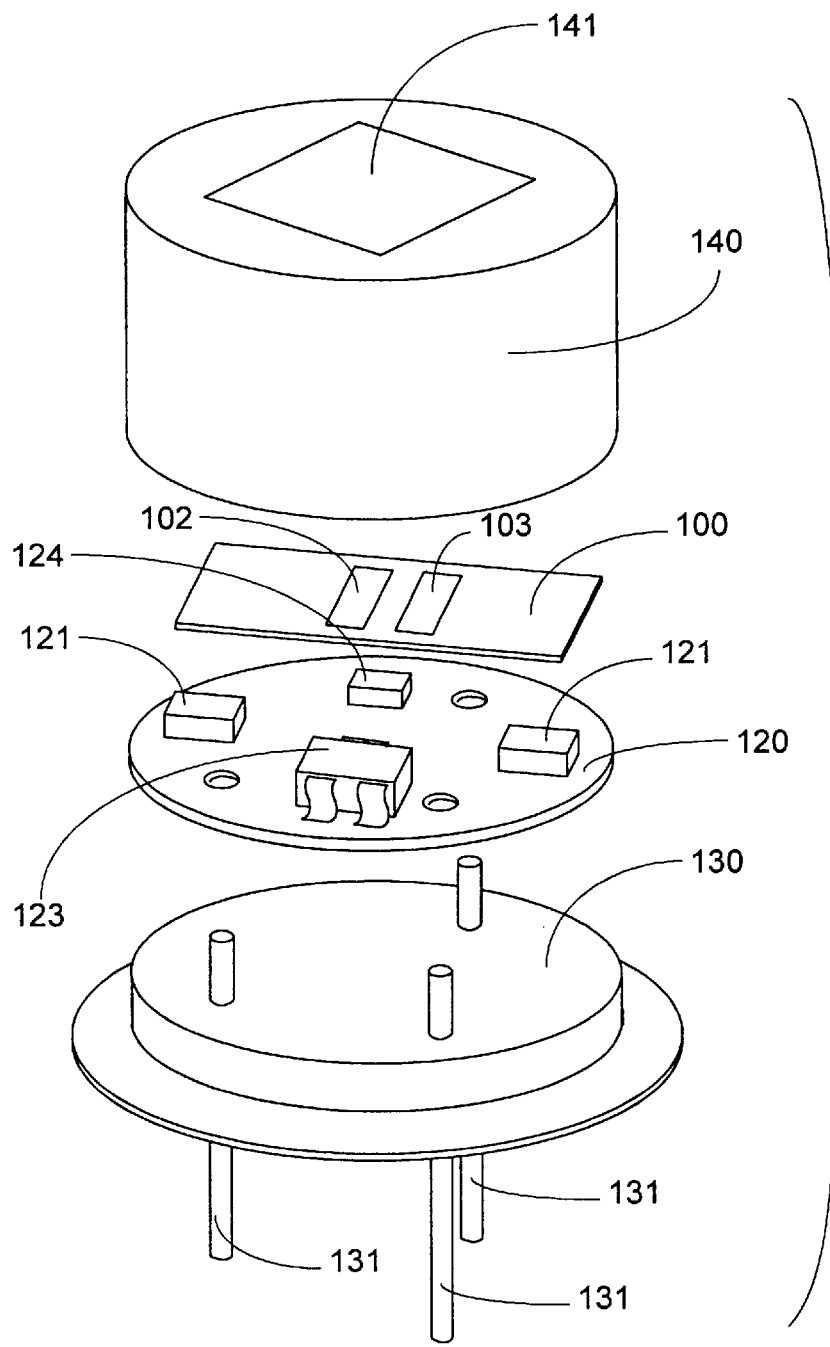
FIG. 26 is an exploded perspective view of a pyroelectric-type IR sensor of the prior art.
Figure 27A:
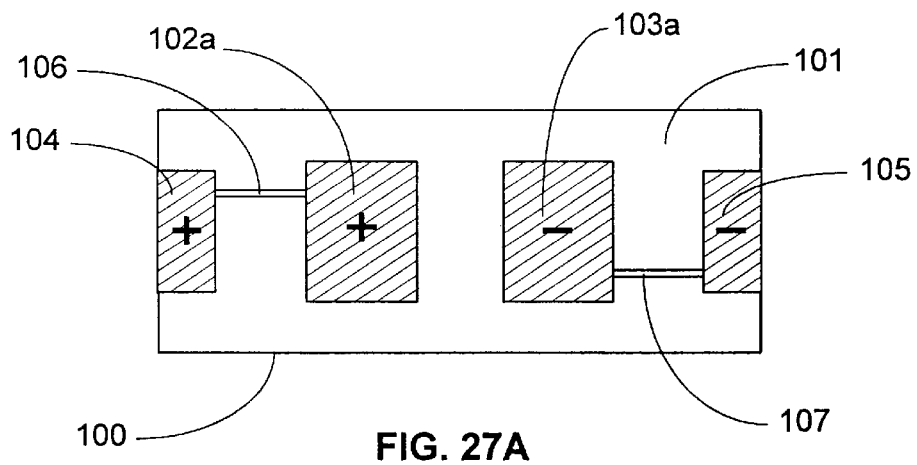
FIGS. 27A and 27B respectively show conductive patterns formed on top and bottom surfaces of an IR receiving element of the prior art.
Figure 27B:
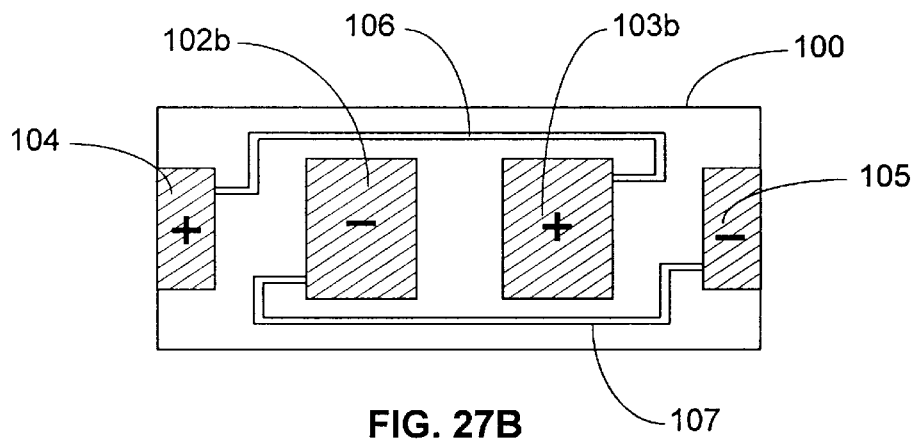
Figure 27C:
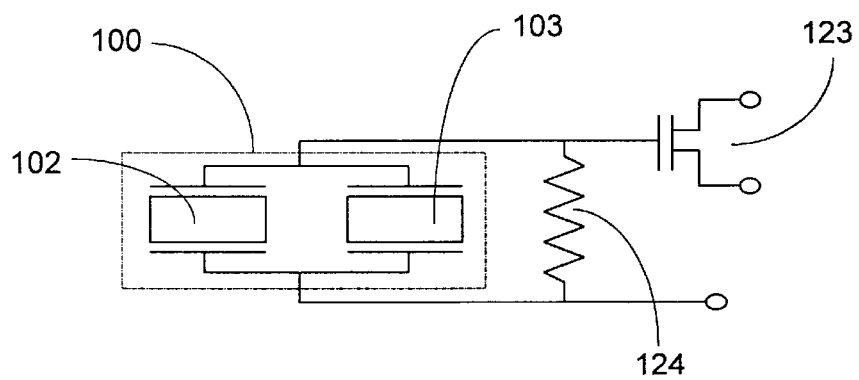
FIG. 27C is a circuit diagram of the prior art.
Figure 28A:
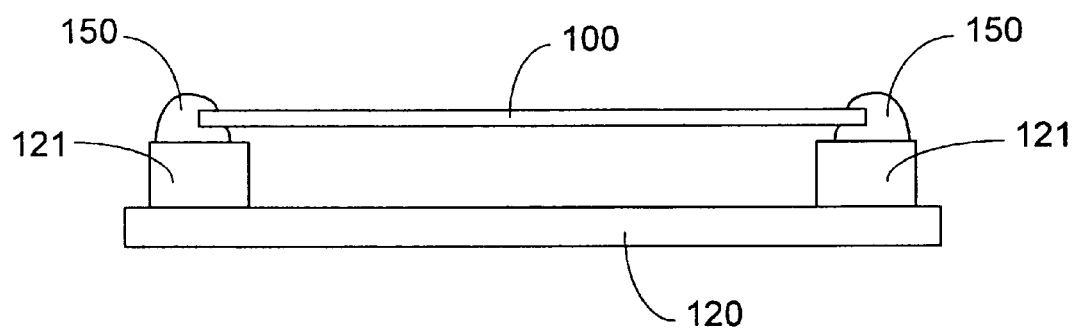
FIGS. 28A and 28B are explanatory views of a thermal stress applied to the IR receiving element of the prior art.
Figure 28B:
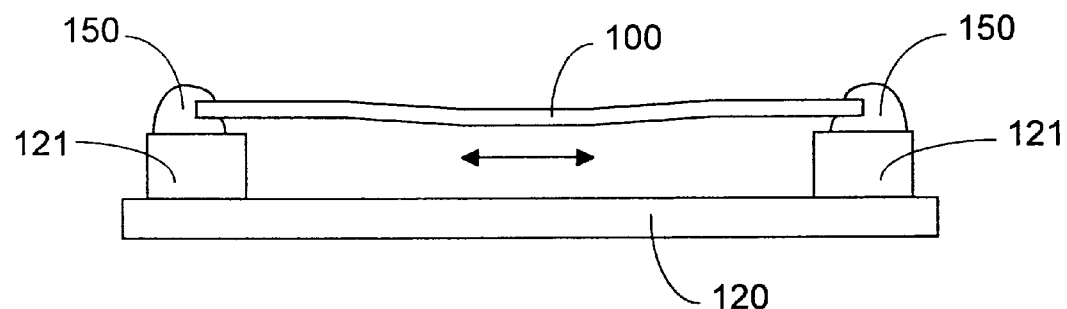

A simulation for estimating stress absorbing capability is carried out with respect to the IR receiving elements 1, 1D and 1E. That is, this simulation is to analyze a stress distribution applied to the respective IR receiving element when one end of the IR receiving element is fixed, and the other end is forcedly lifted up, as shown by an arrow in FIG. 22. Results are shown in FIGS. 23, 24, and 25. The result of FIG. 23 shows that no stress region of more than $0.4 \times 10^9$ Pa is observed on the patches 11 and 13 under the electrodes 20, however, such a stress region is observed in the vicinity of the cantilever end 15. In addition, stress regions of more than $1.6 \times 10^9$ Pa are observed at the ends of the U-shaped slit 30. On the other hand, the result of FIG. 24 shows that no stress region of more than $0.4 \times 10^9$ Pa is observed on the patches 11D and 13D under the electrodes 20D, and the development of the stress region at a cantilever end 15D is slightly reduced as compared with that of the IR receiving element 1. That is, a maximum principal stress applied to the IR receiving element 1D is reduced by as much as 13%. In addition, no stress region of more than $1.6 \times 10^9$ Pa is observed on a pyroelectric substrate 10D of the IR receiving element 1D. The result of FIG. 25 shows that the development of a stress region of more than $0.4 \times 10^9$ Pa at a cantilever end 15E is remarkably reduced as compared with that of the IR receiving element 1. That is, a maximum principal stress applied to the IR receiving element 1E is reduced by as much as 32%. In addition, no stress region of more than $1.2 \times 10^9$ Pa is observed on a pyroelectric substrate 10E of the IR receiving element 1E. Thus, the IR receiving elements 1D and 1E having unique end shapes of the U-shaped slits 30D and 30E can provide further improvement of the stress absorbing capability. This means that the occurrence of popcorn noise can be prevented more effectively.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A pyroelectric-type IR receiving element, comprising:
   a substrate made of a pyroelectric material which is fixed to a supporting body at its support ends; and
   at least one patch formed in said substrate to have a substantially rectangular shape, said patch being formed on its opposite surfaces with first and second electrodes which are overlapped with each other so as to develop a voltage difference between said first and second electrodes when one of said first and second electrodes receives an IR ray,
   wherein said substrate has a U-shaped slit composed of a pair of side slits and a base slit connecting said side slits, said U-shaped slit continuously surrounding three sides of said patch, so that said patch is supported by said substrate in a cantilever fashion at a cantilever end which is opposed to one of said support ends of said substrate.

2. A pyroelectric-type IR receiving element as set forth in claim 1,
   wherein said at least one patch includes a pair of patches, and said patches are formed in said substrate such that a base slit of a U-shaped slit for one of said patches substantially extends parallel to that of a U-shaped slit for the other patch, and cantilever ends of said patches are respectively opposed to said support ends of said substrate.

3. A pyroelectric-type IR receiving element as set forth in claim 2, wherein said base slits are coupled each other to provide a common base slit between said patches.

4. A pyroelectric-type IR receiving element as set forth in claim 1, wherein each of said side slits is connected to said base slit at a rounded corner.

5. A pyroelectric-type IR receiving element as set forth in claim 1, wherein both ends of said U-shaped slit are bent toward the inside of said U-shaped slit to obtain a neck portion at said cantilever end.

6. A pyroelectric-type IR receiving element as set forth in claim 1, wherein said U-shaped slit is formed in a horseshoe-shaped slit.

7. A pyroelectric-type IR receiving element as set forth in claim 1, wherein both ends of said U-shaped slit are formed with rounded holes having a diameter larger than its slit width to obtain a neck portion at said cantilever end.

8. A pyroelectric-type IR sensor comprising:
   said IR receiving element of claim 1;
   a three-dimensional circuit block on which said IR receiving element is mounted; and
   a package for incorporating said circuit block therein,
   wherein said circuit block comprises:
     a pair of stands formed on a top surface of said circuit block, said support ends of said IR receiving element being fixed to said stands such that said IR receiving element extends between said stands in a bridge fashion; and
     a front wall mounting thereon at least one electronic component forming a signal treatment circuit for treating a signal provided from said IR receiving element.

9. A pyroelectric-type IR sensor as set forth in claim 8, wherein said circuit block comprises a rear wall mounting thereon further electronic components.

10. A pyroelectric-type IR sensor as set forth in claim 9, wherein said circuit block comprises a pair of side walls having a plurality of grooves extending between said front and rear walls which are adopted to make conductive paths.

11. A pyroelectric-type IR sensor as set forth in claim 8, wherein said circuit block comprises a stabilizer formed at a lower side of said front wall, said stabilizer having a hole for receiving a pin projecting from a base plate of said package.

* * * * *